US012755031B2

(12) United States Patent
Chalk et al.

(10) Patent No.: US 12,755,031 B2
(45) Date of Patent: Oct. 6, 2026

(54) SYSTEMS AND METHODS FOR DATA EXFILTRATION PREVENTION IN A ZERO-TRUST ENVIRONMENT

(71) Applicant: BeeKeeperAI, Inc., Austin, TX (US)

(72) Inventors: Mary Elizabeth Chalk, Austin, TX (US); Robert Derward Rogers, Oakland, CA (US); Alan Donald Czeszynski, Pleasanton, CA (US)

(73) Assignee: BeeKeeperAI, Inc., Austin, TX (US)

( * ) Notice: Subject to any disclaimer, the term of this patent is extended or adjusted under 35 U.S.C. 154(b) by 240 days.

(21) Appl. No.: 18/492,729

(22) Filed: Oct. 23, 2023

(65) Prior Publication Data

US 2024/0143794 A1 May 2, 2024

Related U.S. Application Data

(60) Provisional application No. 63/420,268, filed on Oct. 28, 2022.

(51) Int. Cl.
*G06F 21/60* (2013.01)

(52) U.S. Cl.
CPC .................................. *G06F 21/602* (2013.01)

(58) Field of Classification Search
CPC . G06F 21/6245; G06F 21/602; G06F 21/6254
USPC .......................................................... 713/193
See application file for complete search history.

(56) References Cited

U.S. PATENT DOCUMENTS 10,630,468 B1 * 4/2020 Wang ...................... H04L 9/008
2019/0034658 A1 * 1/2019 Xie ..................... G06F 21/6245
2019/0108355 A1 4/2019 Carson
2020/0125762 A1 * 4/2020 Xie ......................... G06F 21/57
2020/0311540 A1 10/2020 Chakraborty et al.
2021/0141940 A1 * 5/2021 Naqvi ................... G06F 21/602
2021/0149788 A1 * 5/2021 Downie .............. G06F 11/3604
2021/0360010 A1 * 11/2021 Zaccak .................. G06N 20/20
2022/0066456 A1 * 3/2022 Ebrahimi Afrouzi ........................ G06F 3/04883
2023/0044102 A1 * 2/2023 Anderson .............. G06N 20/20
2023/0044294 A1 * 2/2023 Aravamudan .......... G06F 21/53
2023/0229786 A1 * 7/2023 Eloul .................... G06F 21/577

(Continued)

OTHER PUBLICATIONS

NPL Search Term (Year: 2026).*

(Continued)

*Primary Examiner* — Syed A Zaidi
(74) *Attorney, Agent, or Firm* — IP Strategy Consulting

(57) ABSTRACT

Systems and methods for data exfiltration prevention is provided. In some embodiments, exfiltration detection includes receiving an algorithm and a data set within a secure computing node. The algorithm is trained on the data set to generate a set of weights. A determination is made if the algorithm originated from a trusted source. When it is a trusted source, an unintentional data exfiltration analysis is performed. Conversely, when the source is not known to be trusted an intentional data exfiltration analysis is performed. Unintentional data exfiltration analysis is considerably more computationally intensive, and as such, making this determination can save significantly on computational resources. If an exfiltration event is identified, the system prevents exporting of the set of weights; otherwise the set of weights can be provided back to the algorithm developer.

18 Claims, 30 Drawing Sheets

(56) References Cited

U.S. PATENT DOCUMENTS

| | | | | |
|---|---|---|---|---|
| 2023/0334145 | A1* | 10/2023 | Venkataraman | G06F 21/56 |
| 2024/0184885 | A1* | 6/2024 | Langworthy | G06F 21/55 |

OTHER PUBLICATIONS

NPL Search Terms (Year: 2026).*

ISA/US, "Notification of Transmittal of the ISR and the Written Opinion of the International Searching Authority, or the Declaration," in PCT Application No. PCT/US2023/077599, Feb. 28, 2024, 12 pages.

* cited by examiner

SYSTEMS AND METHODS FOR DATA EXFILTRATION PREVENTION IN A ZERO-TRUST ENVIRONMENT

CROSS REFERENCE TO RELATED APPLICATIONS

This application claims the benefit and priority of U.S. Provisional Application No. 63/420,268, filed on Oct. 28, 2022, entitled "Systems And methods For Data Exfiltration Prevention In A Zero-Trust Environment", the contents of which is incorporated herein in its entirety by this reference.

BACKGROUND

The present invention relates in general to the field of zero-trust computing, and more specifically to methods, computer programs and systems for data protection in a zero-trust environment. Such systems and methods are particularly useful in situations where algorithm developers wish to train their algorithms on data that is highly sensitive, such as protected health information. For avoidance of doubt, an algorithm may include a model, code, pseudo-code, source code, or the like.

Within certain fields, there is a distinguishment between the developers of algorithms (often machine learning of artificial intelligence algorithms), and the stewards of the data that said algorithms are intended to operate with and be trained by. On its surface this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered in their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA, that include strict requirements on the sharing of PHI, and are subject to significant fines if such requirements are not adhered to.

Healthcare related information is of particular focus of this application. Of all the global stored data, about 30% resides in healthcare. This data provides a treasure trove of information for algorithm developers to train their specific algorithm models (AI or otherwise) and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. More than 12,000 life-science papers described AI and ML in 2019 alone. Yet the U.S. Food and Drug Administration (FDA) has only approved only slightly more than 30 AI/ML-based medical technologies to date. Data access is a major barrier to clinical approval. The FDA requires proof that a model works across the entire population. However, privacy protections make it challenging to access enough diverse data to accomplish this goal.

If the issue of data privacy weren't already complex and fraught with potential pitfalls, there is additionally the possibility that models trained on the secret data may exfiltrate the data (either inadvertently or intentionally). Exfiltration of data is a significant concern for the data stewards, and many potential collaborations are avoided due to the (rightful) concerns by the data stewards that their proprietary and highly sensitive data may be compromised.

Machine learning models have significant numbers of potential numerical weights that enable proper model operation. However, these weights may also be utilized as a distributed memory structure capable of storing vast amounts of information. These weights may obscure the data that they contain as well, making it problematic to train the model on a dataset without the concern that the model is also copying the data for exfiltration.

To some degree, this concern over data exfiltration is alleviated by the selective partnering between algorithm developers with 'good' reputations and the data stewards. There are two main issues with this however: firstly, this selective partnering makes it very difficult for new players to enter the market, possibly keeping powerful modeling tools from being leveraged by the data stewards. Secondly, even with 'trusted' algorithm developers, there is frequently issues with unintentional data exfiltration. Even though this data exfiltration is done without malicious intent, the ramifications of such a data breach are no less detrimental.

It is therefore clear that there is a significant need for the protection of data from exfiltration by AI models that train upon said data. This includes the determination of if an exfiltration event will occur—allowing for intervention with the weight output. Secondly, there is a need for the ability to train models without the possibility of data loss by decoupling the training activity from the sensitive data.

SUMMARY

The present systems and methods relate to data exfiltration protection within a secure and zero-trust environment. Such systems and methods guarantee that data exfiltration is prevented during model training, and also enables training techniques that eliminate the possibility of data exfiltration. These tools together enables data stewards to operate without concern of data breaches, potentially allowing broader partnerships between data stewards and a wider range of algorithm developers.

In some embodiments, the exfiltration detection includes receiving an algorithm and a data set within a secure computing node. The algorithm is trained on the data set to generate a set of weights. A determination is made if the algorithm originated from a trusted source. When it is a trusted source, an unintentional data exfiltration analysis is performed. Conversely, when the source is not known to be trusted an intentional data exfiltration analysis is performed. Unintentional data exfiltration analysis is considerably more computationally intensive, and as such, making this determination can save significantly on computational resources. If an exfiltration event is identified, the system prevents exporting of the set of weights; otherwise the set of weights can be provided back to the algorithm developer.

Unintentional data exfiltration analysis includes weight profiling and data scrubbing. The data scrubbing includes comparing the set of weights against the data set. Conversely, the intentional data exfiltration analysis includes performing at least one of a differential privacy methodology, a post fact analysis, a data duplication or distillation analysis, a data injection analysis and a weight profiling analysis.

The differential privacy methodology includes training the algorithm with differential privacy data, tuning the trained algorithm using the data set, comparing the weight space between the trained algorithm and the tuned algorithm; and detecting an exfiltration event when the compared weight space is above a configured threshold.

The post fact analysis includes training the algorithm using the data set to generate a first trained algorithm, removing a record from the data set to generate an altered data set, training the algorithm on the altered data set to generate a subsequent trained algorithm, comparing the weights of the first trained algorithm against those of the subsequent trained algorithm, repeating this for each record in the data set, and detecting an exfiltration event when any compared weight of any subsequent trained algorithm versus the first trained algorithm is above a configured threshold.

Data duplication or distillation analysis includes performing duplicating at least some of the records in the data set and/or distilling the records of the data set to generate an altered data set, training the algorithm on the data set to generate a first set of weights, training the algorithm on the altered data set to generate a second set of weights, comparing the first set of weights against the second set of weights, and detecting an exfiltration event when the comparison is above a configured threshold.

The data injection analysis includes adding at least one innocuous record into the data set to generate an altered data set, training the algorithm on the data set to generate a first set of weights, training the algorithm on the altered data set to generate a second set of weights, comparing the first set of weights against the second set of weights, and detecting an exfiltration event when the comparison is above a configured threshold.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for the zero-trust application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, financial, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models. However, algorithms may also apply to more mundane model types, such as linear models, least mean squares, or any other mathematical functions that convert one or more input values, and results in one or more output models.

Figure 1A:
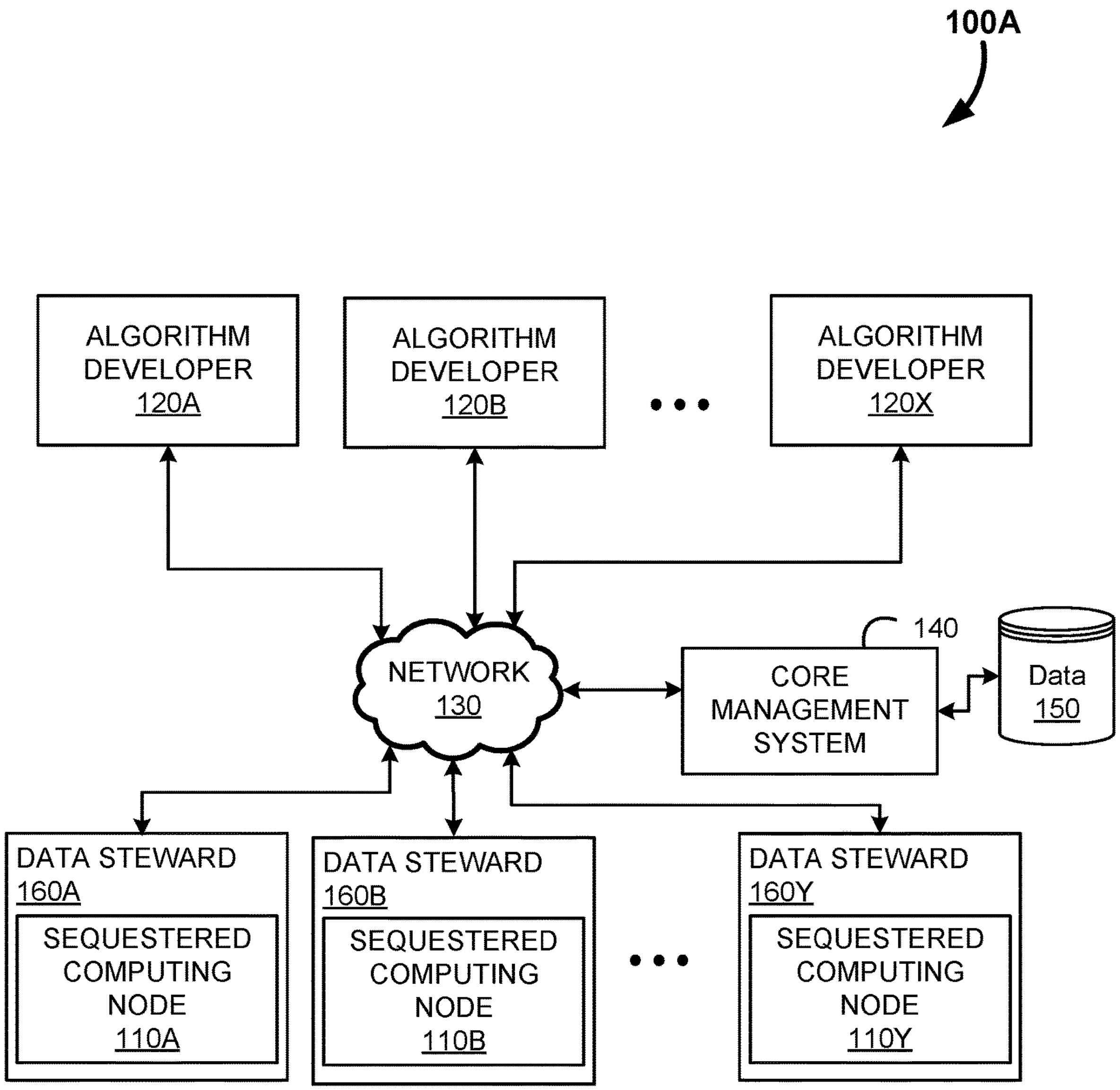
FIGS. 1A and 1B are example block diagrams of a system for zero trust computing of data by an algorithm, in accordance with some embodiment.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably. To facilitate discussions, FIG. 1A is an example of a zero-trust infrastructure, shown generally at 100*a*. This infrastructure includes one or more algorithm developers 120*a-x* which generate one or more algorithms for processing of data, which in this case is held by one or more data stewards 160*a-y*. The algorithm developers are generally companies that specialize in data analysis, and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120*a-x*, and the data stewards 160*a-y* and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

In this particular system, the data stewards maintain sequestered computing nodes 110*a-y* which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390 unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example).

In some particular embodiments, the system sends algorithm models via an Azure Confidential Computing environment to two data steward environments. Upon verification, the model and the data entered the Intel SGX sequestered enclave where the model is able to be validated against the protected information, for example PHI, data sets. Throughout the process, the algorithm owner cannot see the data, the data steward cannot see the algorithm model, and the management core can see neither the data nor the model.

The data steward uploads encrypted data to their cloud environment using an encrypted connection that terminates inside an Intel SGX-sequestered enclave. Then, the algorithm developer submits an encrypted, containerized AI model which also terminates into an Intel SGX-sequestered enclave. A key management system in the management core enables the containers to authenticate and then run the model on the data within the enclave. The data steward never sees the algorithm inside the container and the data is never visible to the algorithm developer. Neither component leaves the enclave. After the model runs, the developer receives a performance report on the values of the algorithm's performance (as will be discussed in considerable detail below). Finally, the algorithm owner may request that an encrypted artifact containing information about validation results is stored for regulatory compliance purposes and the data and the algorithm are wiped from the system.

Figure 1B:
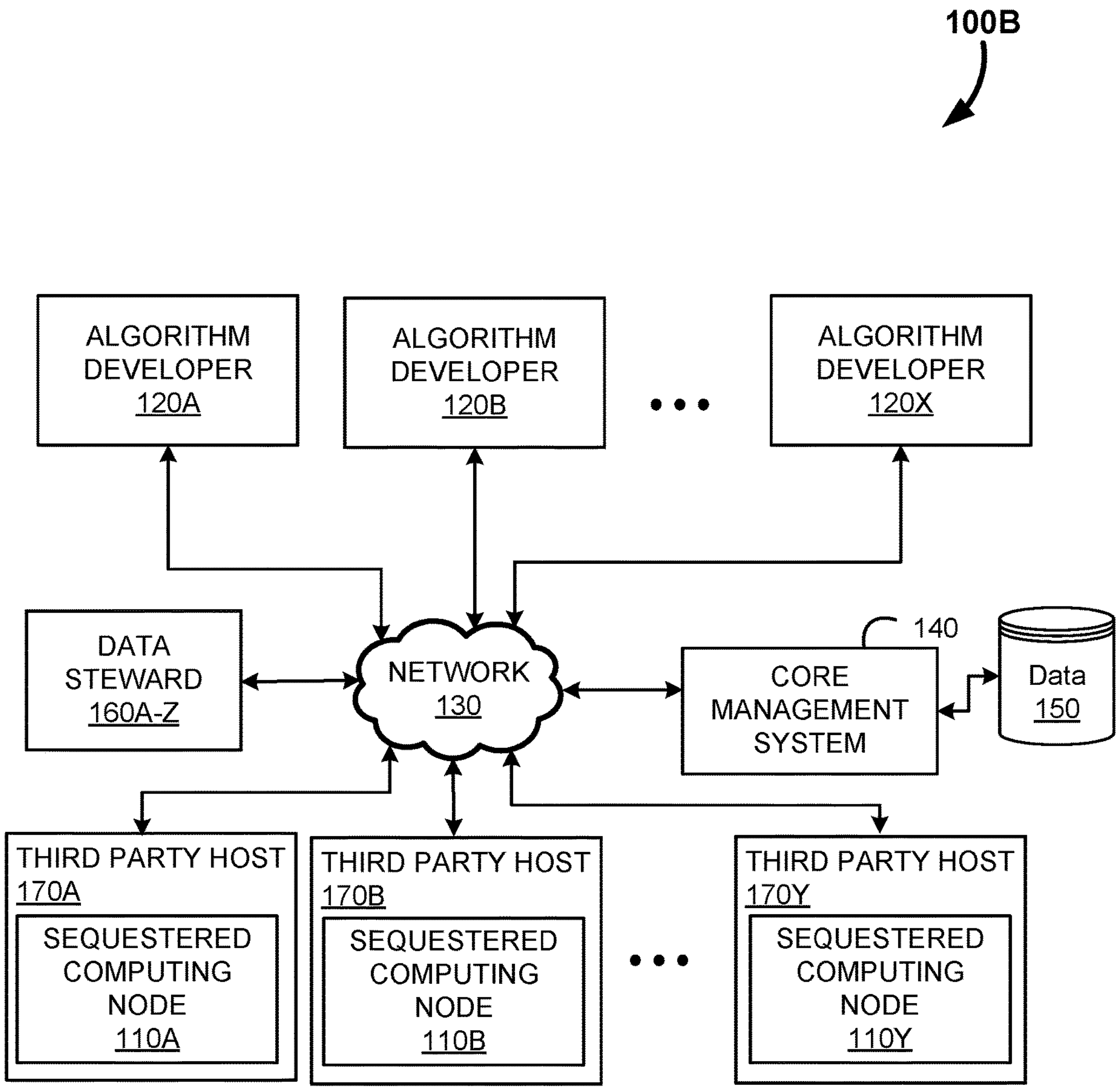

FIG. 1B provides a similar ecosystem 100*b*. This ecosystem also includes one or more algorithm developers 120*a-x*, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110*a-y* are present within a third party host 170*a-y*. An example of a third-party host may include an offsite server such as Amazon Web Service (AWS) or similar cloud infrastructure. In such situations, the data steward encrypts their dataset(s) and provides them, via the network, to the third party hosted sequestered computing node(s) 110*a-y*. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
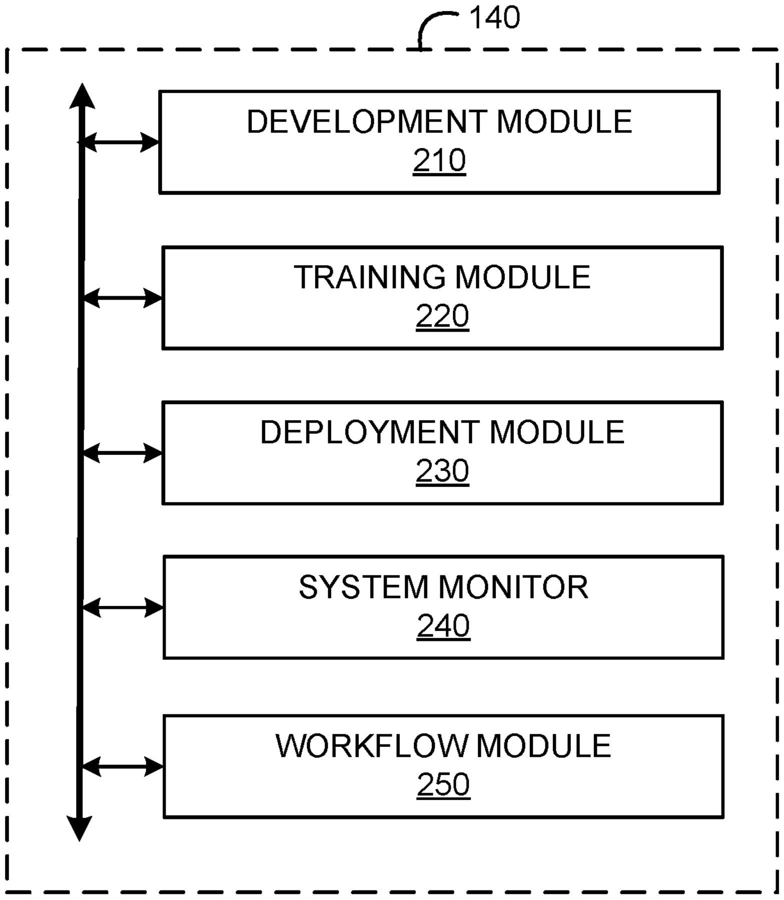
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Figure 3:
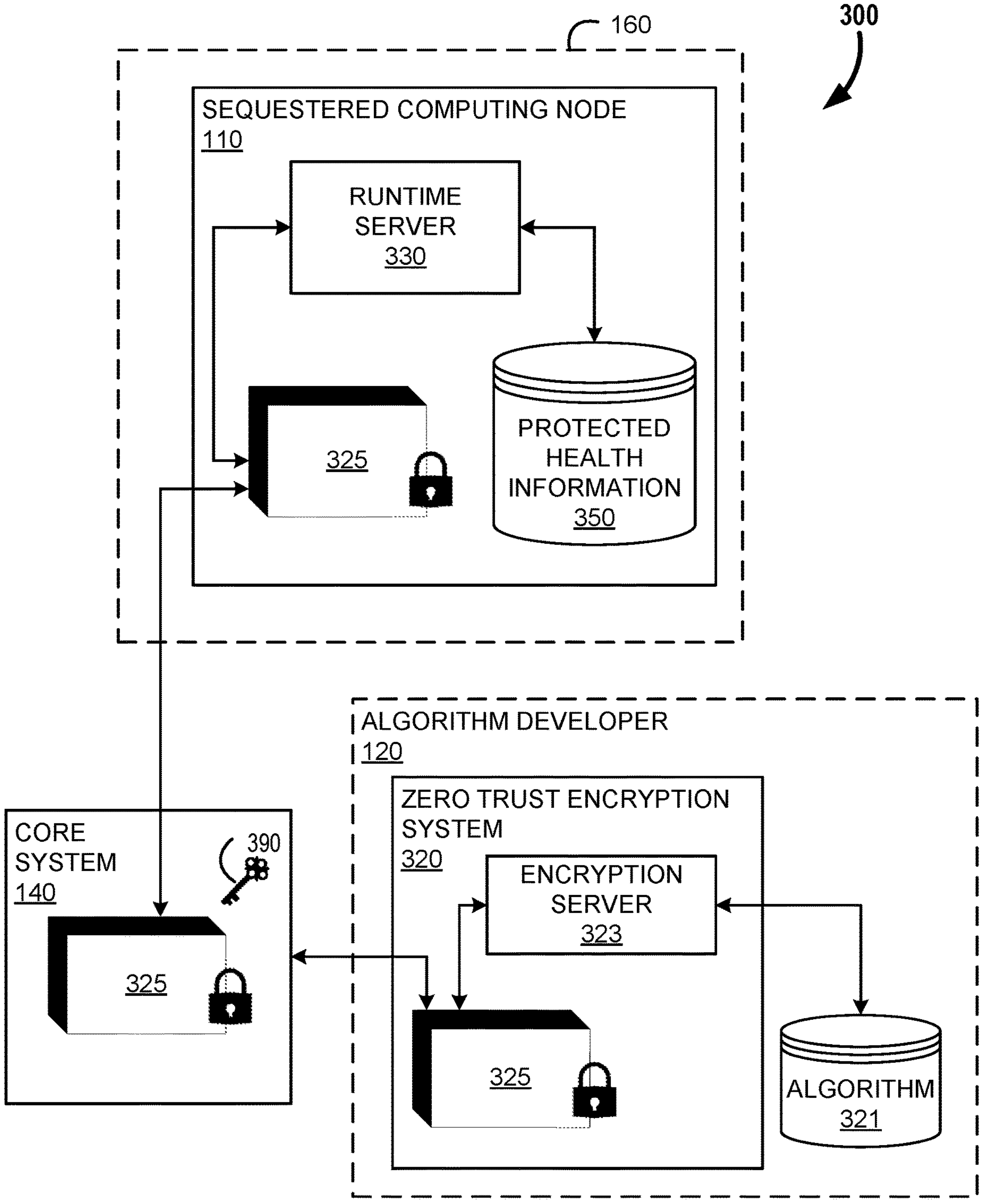
FIG. 3 is an example block diagram showing a first model for the zero-trust data flow, in accordance with some embodiment.

Turning now to FIG. 3, a first model of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 (the "algorithm" or "algo") to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

Figure 4:
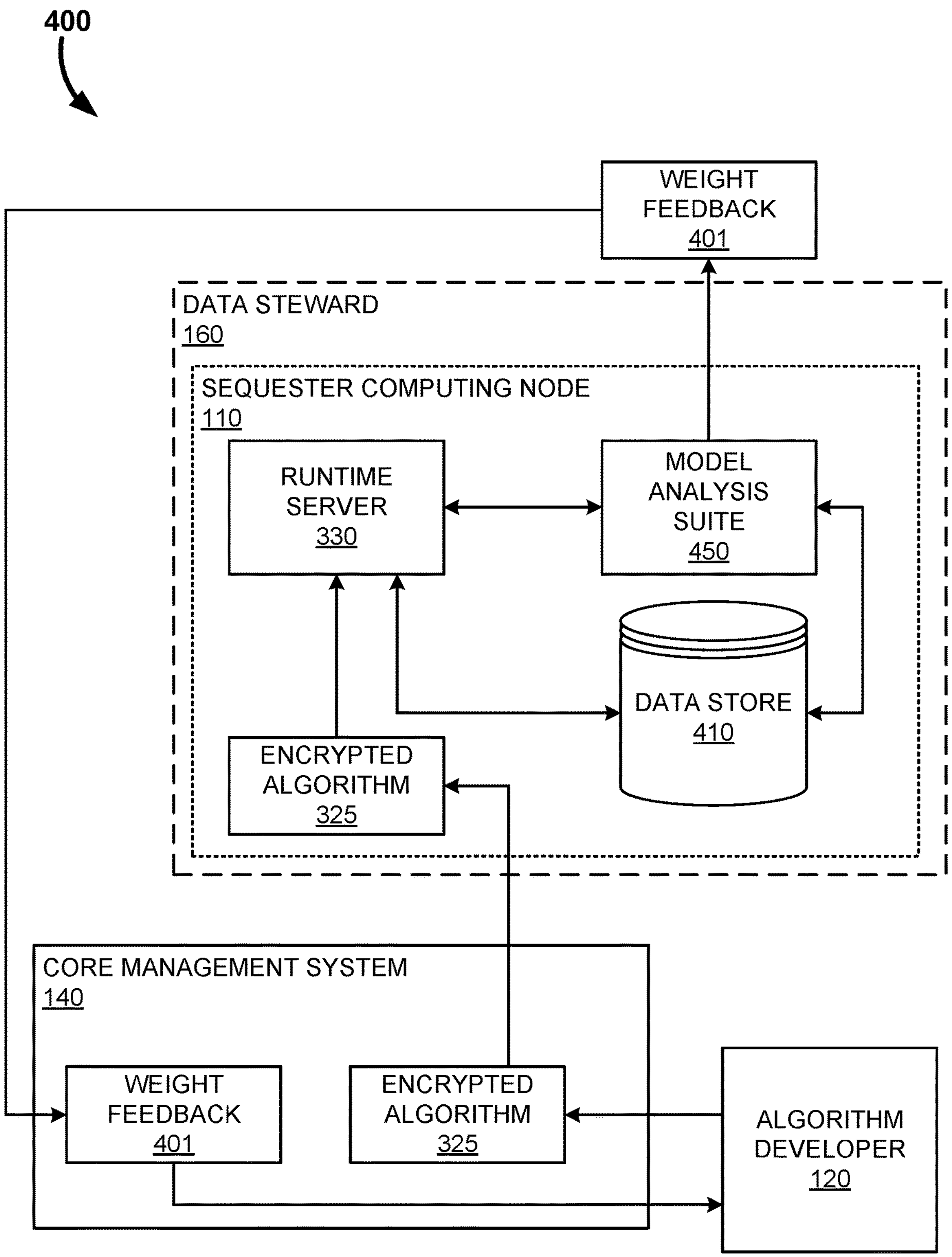
FIG. 4 is an example block diagram showing a model for the zero-trust data flow with data exfiltration analysis, in accordance with some embodiment.

Turning to FIG. 4, the general environment is maintained, as seen generally at 400, however in this embodiment the flow of the IP assets is illustrated in greater detail. In this example diagram, the Algorithm developer 120 generates an algorithm, which is then encrypted and provided as an encrypted algorithm payload 325 to the core management system 140. As discussed previously, the core management system 140 is incapable of decrypting the encrypted algorithm 325. Rather, the core management system 140 controls the routing of the encrypted algorithm 325 and the management of keys. The encrypted algorithm 325 is then provided to the data steward 160 which is then "placed" in the sequestered computing node 110. The data steward 160 is likewise unable to decrypt the encrypted algorithm 325 unless and until it is located within the sequestered computing node 110, in which case the data steward still lacks the ability to access the "inside" of the sequestered computing node 110. As such, the algorithm is never accessible to any entity outside of the algorithm developer.

Likewise, the data steward 160 has access to protected health information and/or other sensitive information. The data steward 160 never transfers this data outside of its ecosystem, thus ensuring that the data is always inaccessible by any other party. The sensitive data may be encrypted (or remain in the clear) as it is also transferred into the sequestered computing node 110. This data store 410 is made accessible to the runtime server 330 also located "inside" the sequestered computing node 110. The runtime server 330 decrypts the encrypted algorithm 325 to yield the underlying algorithm model. This algorithm may then use the data store 410 to generate inferences regarding the date contained in the data store 410 (not illustrated). These inferences have value for the data steward 110, and may be outputted to the data steward for consumption.

The runtime server 330 may also perform a number of other operations. One critical function of the runtime server is to train the encrypted algorithms. Training the algorithm on the data generates a series of numerical weights. These weights may be feature vectors, integer values, or may take other forms. The weights, when output as feedback 401, may be provided from the core management system 140 back to the algorithm developer 120 for refining their model. Unfortunately, during model training, it is possible to store additional information within the weight values. This allows for the exfiltration, either deliberate or inadvertent, of the data steward's 160 sensitive data. This is a significant concern to the data steward 160, and as such the system includes a model analysis suite 450 which consumes the trained model and data from the data steward 160 in order to analyze the trained model for exfiltration activity, and also to enable exfiltration resistant training feedback (not illustrated), to the algorithm developer 120 for model refinement in lieu of receiving the actual weights.

Figure 5A:
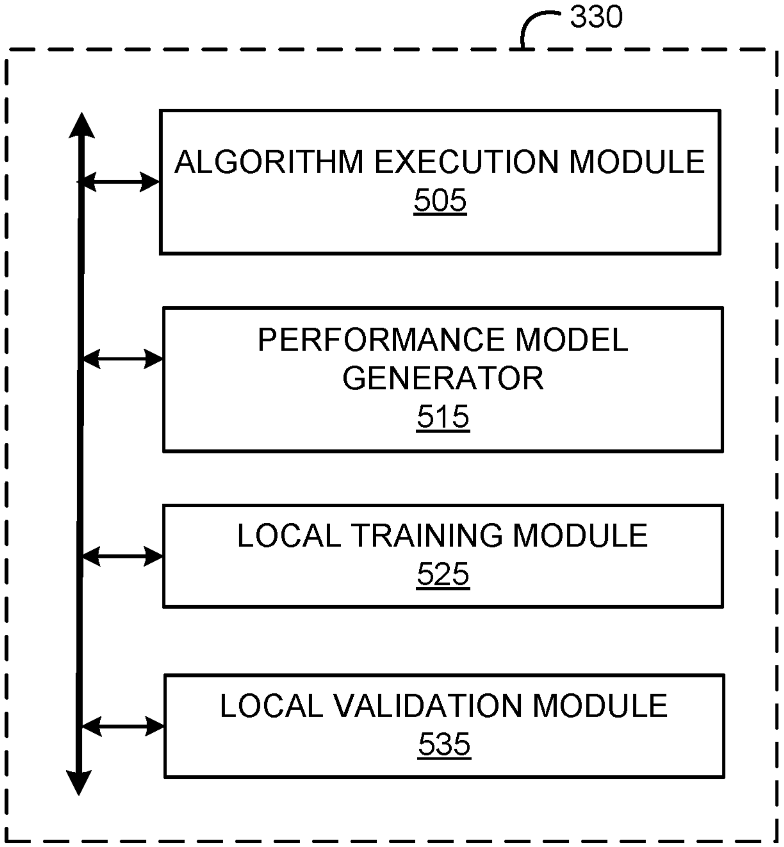
FIG. 5A is an example block diagram showing a runtime server, in accordance with some embodiment.

FIG. 5A provides a more detailed illustration of the functional components of the runtime server 330. An algorithm execution module 510 performs the actual processing of the PHI 411 using the algorithm 325. The result of this execution includes the generation of discrete inferences.

The runtime server 330 may include a performance model generator 520 which receives outputs from the algorithm execution module 510 and generates a performance model 401 using a recursion methodology.

In some embodiments, the runtime server 330 may additionally execute a master algorithm, and tune/train the algorithm locally at a local training module 530. Such localized training is known, however, in the present system, the local training module 530 may further be configured to take the locally tuned model and then reoptimize the master. The new reoptimized master may, in a reliable manner, be returned to achieve performance that is better than the prior model's performance, yet staying consistent with the prior model. This consistency includes relative weighting of particular datapoints to ensure consistency in the models for these key elements while at the same time improving performance of the model generally. As detailed before, this training process, while necessary for the generation of effective models, is a potential vulnerability for the exfiltration of sensitive data.

In some embodiments, the confirmation that a retuned model is performing better than the prior version is determined by a local validation module 540. The local validation module 540 may include a mechanical test whereby the algorithm is deployed with a model specific validation methodology that is capable of determining that the algorithm performance has not deteriorated after a re-optimization. In some embodiments, the tuning may be performed on different data splits, and these splits are used to define a redeployment method. It should be noted that increasing the number (N) of samplings used for optimization not only improves the model's performance, but also reduces the size of the confidence interval.

Figure 5B:
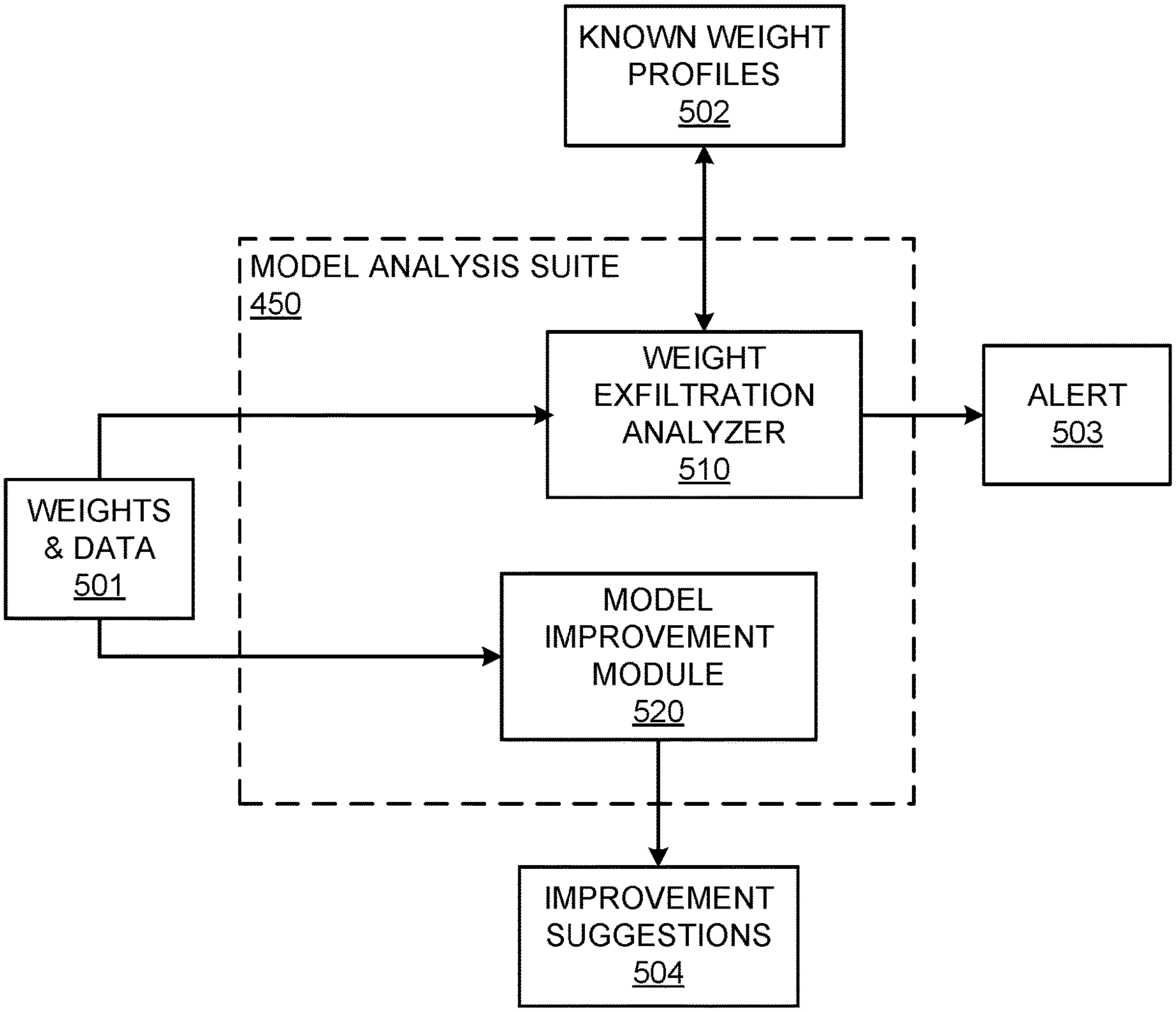
FIG. 5B is an example block diagram showing a model analysis suite, in accordance with some embodiment.

FIG. 5B provides a more detailed illustration of the model analysis suite 450. This system consumes the weights from the trained model (and the model performance data), the data from the data steward (collectively 501). The model analysis suite 450 consists of two main elements: a weight exfiltration analyzer 510 that identifies when there is an instance of potential data exfiltration, and a model improvement module 520 which is resistant to any exfiltration events. The weight exfiltration analyzer 510 consumes the model and through a series of techniques determines if there is a risk of data loss. Some of these techniques leverage known weight profiles 502. Other techniques rely upon computationally intensive analysis of the models, as will be discussed in significant detail below. When there is a possible data exfiltration event, the weight exfiltration analyzer 510 may generate an alert 503, and the system may take preventative action to ensure that no data escapes the sequestered computing node. This includes preventing the weight feedback from being sent to the algorithm developer 120, as well as possibly instituting an audit workflow, and notifying the algorithm developer of the issue so that it can be corrected. Conversely, when no data exfiltration event is identified, the system may confidently release the trained weights back to the algorithm developer 120 for improving their models.

In addition to determining when there may have been an exfiltration event, the model analysis suite 450 may likewise provide a means for model improvements without the possibility of data exfiltration. The model improvement module 520 is capable of generating such improvement suggestions 504 for the algorithm developer 120 to institute. While not as direct as merely providing the trained weights to the algorithm developer 120, this additional layer of protections may enable model improvements were it would otherwise not be possible. For example, if there is an indication that a model is exfiltrating data, this improvement system may still allow for the model to be improved upon without risk of data loss. Further, based upon some data steward's 160 requirements, it may not be possible to simply output trained weights.

Figure 5C:
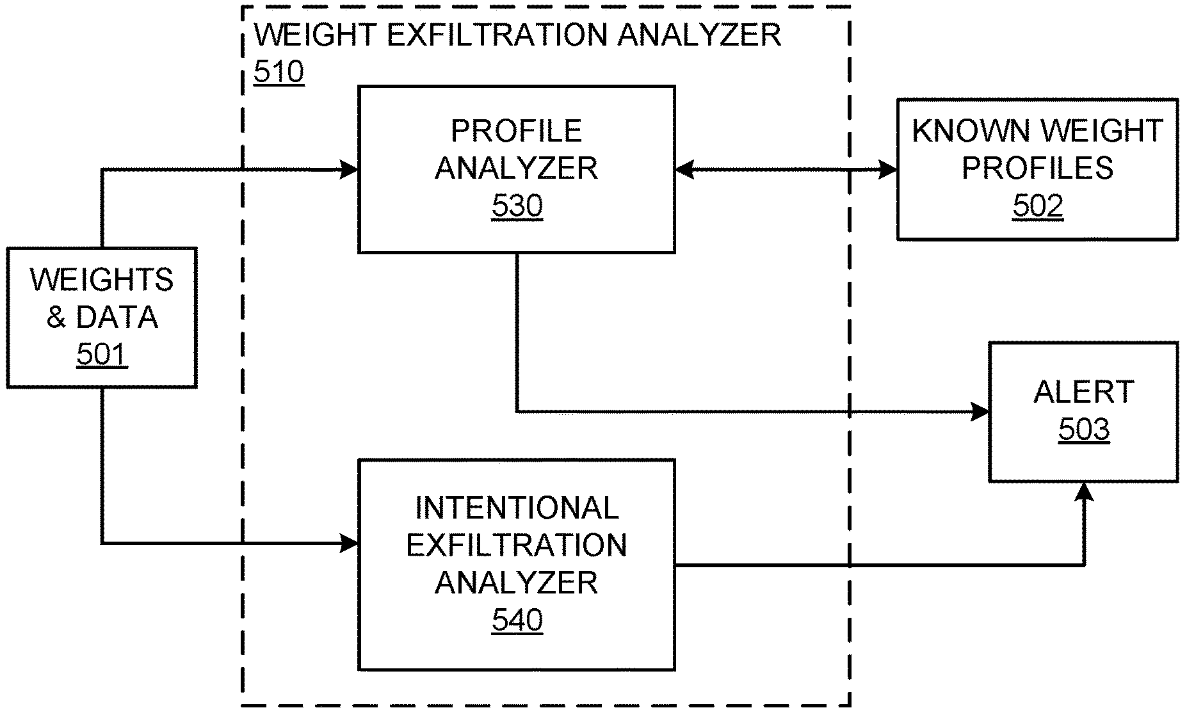
FIG. 5C is an example block diagram showing an exfiltration analyzer, in accordance with some embodiment.

At FIG. 5C more detail of the weight exfiltration analyzer 510 is provided. The weight exfiltration analyzer 510 contains two main components: a profile analyzer 530 intended to identify situations of inadvertent exfiltration, and an intentional exfiltration analyzer 540. The profile analyzer 530 utilizes known weight profiles 502 as well as performing scrubbing and profile generation in the analysis of the models. The intentional exfiltration analyzer 540 utilizes one or more of a series of computationally strenuous techniques to determine if there is a purposeful exfiltration attempt.

Figure 5D:
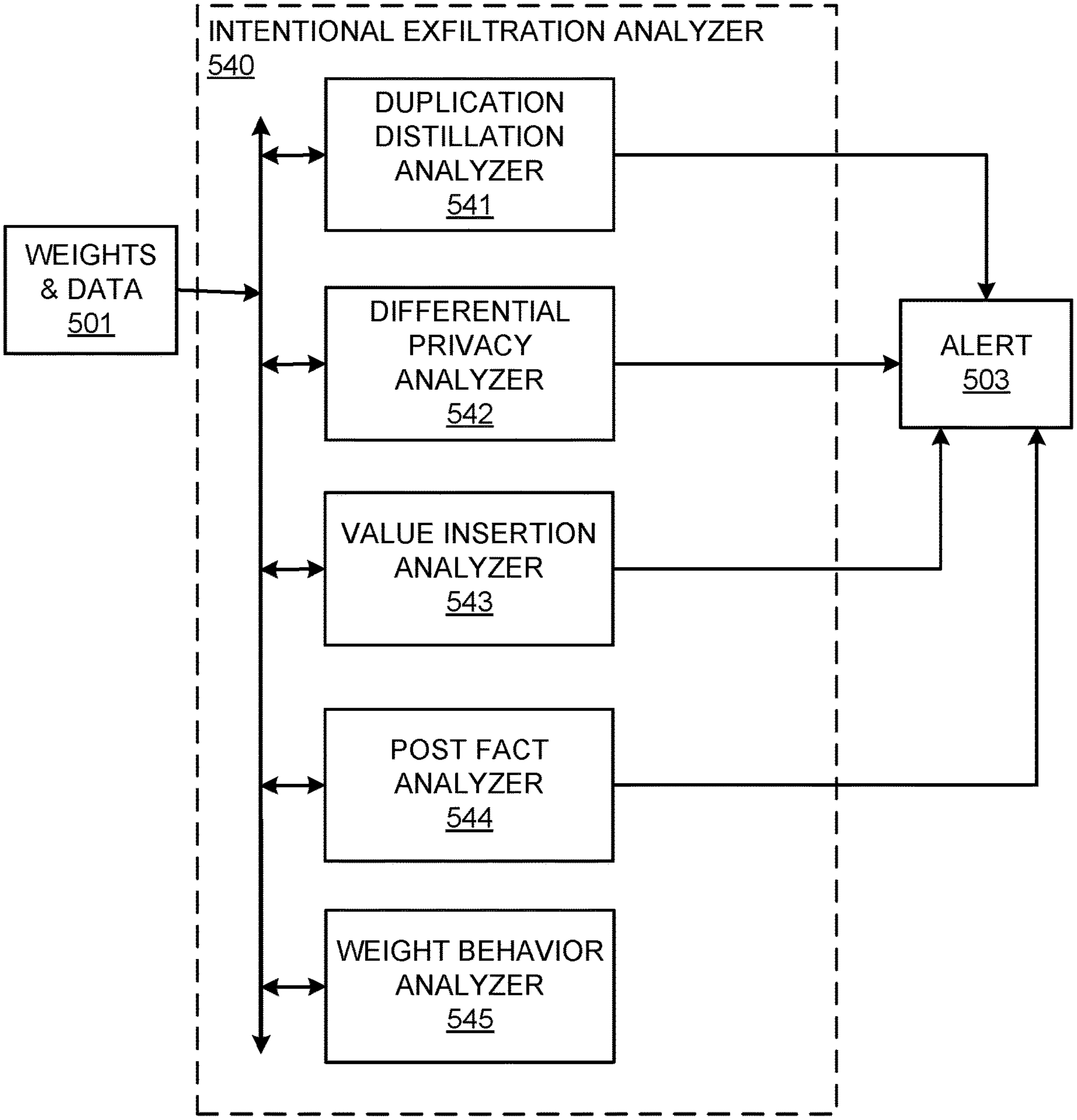
FIG. 5D is an example block diagram showing an intentional exfiltration analyzer, in accordance with some embodiment.

FIG. 5D provides a greater detailed illustration of the intentional exfiltration analyzer 540. There are five main techniques employed to determine if there is an exfiltration attempt. These are performed by the duplication/distillation analyzer 541 which is a relatively computationally light analysis. In this analysis, records are duplicated in part, or in full, and the model is retrained upon the dataset. In some cases, the duplicated records are seeded with noise to prevent malicious algorithms from implementing a de-duplication function. Alternatively, the duplication/distillation analyzer 541 may perform a record distillation process which determines which 'core' records are needed to generate the generalized model weights. A number of methods for dataset distillation exist. In the simplest form, subsets of the entire training set are sampled and used for a parallel training task in which partial or complete training is performed. The model trained on the subset is compared with the model trained on the complete set. Subsets for which the "distance" between the two models is small are retained as candidates for inclusion in the distilled dataset. Additional methods for selecting a subset of the training data that captures the salient features of the model exist. In explicit terms:

$$Xd=\text{argmin}[\text{card}(x)] \text{ s.t. } D(w(\hat{x}),w(x))<d$$

where each x is a subset of all of the training data points, x̂ is the original set of all training data points from which x and xd are drawn, xd is the distilled set (the goal of the process). D is the distance measure between two sets of weights, w(x) is the set of weights that result from training the model on training subset x. d is the maximum allowed "distance" between the original set of weights, w(x̂), and the weights derived from the distilled set, w(x̂). The data set is then distilled to these records and retrained on this reduced dataset.

Regardless of whether duplication efforts or distillation efforts were employed, the weights of these retrained models are compared against the weights of the original model. These weights should be relatively 'close', and below a threshold. In some embodiments, the distance between two sets of weights could be calculated by a Euclidean distance (e.g., sum of squares of differences) between all the weights, or a weighted Mean Square Error where the importance of each weight in the sum is determined by the relative impacts of model weight changes on the output of the overall model. Other distance metrics between weights could be employed, such as the cosine angle between the two points in weight space. Another method would be to train a machine learning model to directly detect the impacts of memorization. Starting with a multitude of different trained models, they would be trained to perform memorization tasks. A second model, the "memorization detector" would be trained to detect model weight tensors that were memorizing data. When a significant divergence in weights is present, this indicates that the model is storing something more than training weights, and is indicative of a possible exfiltration event.

The differential privacy analyzer 542 is likewise a relatively computationally light module. This analyzer compares a model that was trained using differential privacy techniques, to a model tuned with an unadulterated dataset. The weights for each of these trained models should likewise be relatively 'close'. Again, divergence between the weights above a threshold would be indicative of an exfiltration attempt. The threshold for 'closeness' of the weight space for this analysis, as compared to the duplication/distillation analyzer 541 may differ. In some embodiments, it is expected that the weights are less close in the differential privacy analysis.

A value insertion analyzer 543 is likewise a relatively computationally light module. The value insertion analyzer 543 strategically inserts values/records into the dataset and compares the trained model from this dataset versus the unadulterated trained model. In some cases, the data that is entered/adjusted in data that, by its nature, will not impact the model operation (e.g., data values unrelated to the medical condition of the patient, such as ID or social security numbers). Model weights that vary significantly as a result of these alterations/additions are likewise indicative of an exfiltration attempt. In some cases, rather than alter values in a manner that should not impact model performance, it may be beneficial to alter and/or insert data that is directly impacting model weights, and when the weights likewise change in a commiserate degree the system determines that the model is not exfiltrating data; however, when the weights change more than expected (as determined by the weight behavior analyzer 545) the system may flag the model as potentially exfiltrating the data.

The post fact analyzer 544 is a relatively computationally intensive process but provides very accurate indications of data exfiltration. In the post fact analyzer 544, the initial model is trained upon the data, but before the trained weights are released, the system undergoes an iterative process of removing each individual record and retraining the model. The differential of the weights based upon the individual record being removed is calculated and compared against a configured threshold. The threshold may be generated by characterizing the specific model, or models similar to the model in question. When there are weight changes above the given threshold, a fraud is detected.

This process requires significant retraining of the model in an iterative fashion. As such, the computational resources required may be relatively significant. The availability of computational resources may be dispositive in determining if and when this exfiltration detection methodology is employed.

The final element of the intentional exfiltration analyzer 540 is a weight behavior analyzer 545 which characterizes the models and how weights change based upon input alterations. The weight behavior analyzer 545 output may be consumed by a number of the other analyzers in their determination of when the changes to the weights of a model are suspect. There are a number of potential mathematical signatures of data memorization in weights that could be detected in this module. For example, when data is being directly memorized and stored as a distributed memory, specific combinations of weights will be impacted significantly by a small number of records (in some cases, just a single record) while other weights are not affected by those records at all. This can indicate that weights are storing individual data elements, rather than generalizing the learnings from multiple points. Another example would be encoding of data in the low-order bits of weight data. This would show up as a disproportionate impact of single records on these portions of the weight values; a signal that would not be expected to significantly exceed noise in the case of actual model training, where the effects of all records will contribute to low-order bits. Other encodings of the raw data in the weights are envisioned, which might generate different signals that could be detected in this module.

Figure 5E:
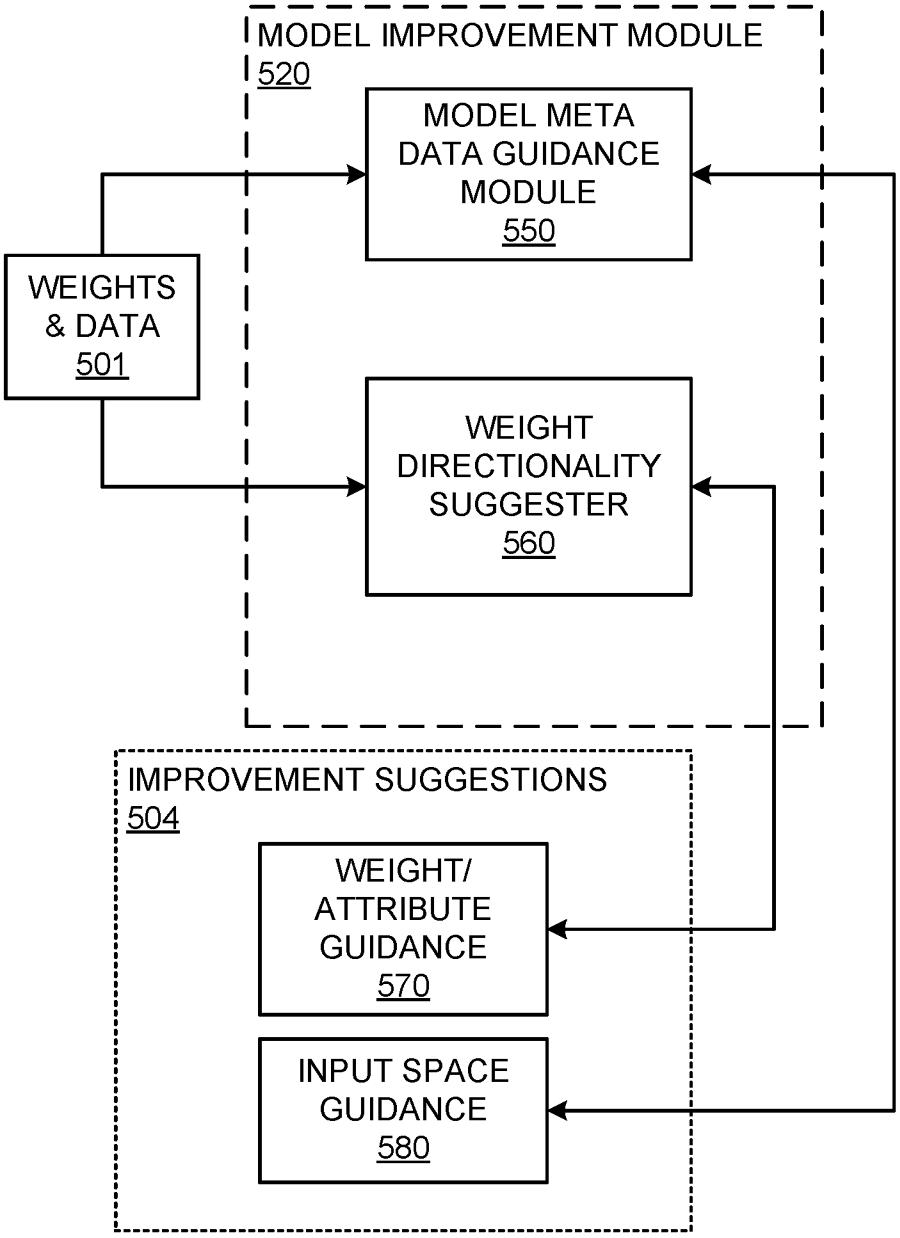
FIG. 5E is an example block diagram showing a model improvement module, in accordance with some embodiment.

Turning to FIG. 5E details of the model improvement module 520 are provided. As noted before, when the chance of exfiltration is high, or when the data steward does not wish for the algorithm to be trained upon the protected data and then have the weights directly provided to the algorithm developer, the model improvement module 520 may act as an intermediary to prevent any chance of data exfiltration. The model improvement module 520 is capable of operating in two discrete ways, the first manner is to provide guidance back to the algorithm developer regarding metadata behaviors. The model meta data guidance module 550 is capable of consuming model weights and data 501 as well as performance data in order to determine where the model does not perform well. For example, suppose a model is generated to predict patients that are at high risk for developing diabetes, but the model performs less well within a particular demographic. This demographic, and an explanation of the model's shortcomings may be presented back to the algorithm developer as input space guidance 580. Simply providing this guidance will not unilaterally generate a well trained model, however after several iterations of providing such guidance, the algorithm developer 'tweaking' the model in response, and retraining and testing the updated model, significant improvements in model functioning can be realized.

The other methodology for providing model improvements is to generate weight/attribute guidance 570 using a weight directionality suggester 560. This module consumes the trained weights and identifies the top X weights that have the largest impact upon model functioning. These X weights may be a configured number, or may consist of all weights that have an impact upon the model performance above a set threshold. The weight guidance 570 identifies the particular weights at issue and indicates a direction for the vector space that the weights should adopt in order to improve model function. In some embodiments, a general amplitude indication could also be provided.

In both these model improvement methodologies, the actual trained weights are never output to the algorithm developer, thereby preventing any chance of data exfiltration. As such, these techniques, alone or in combination with the exfiltration analysis, can harden the present zero-trust environment against inappropriate data sharing.

Figure 6:
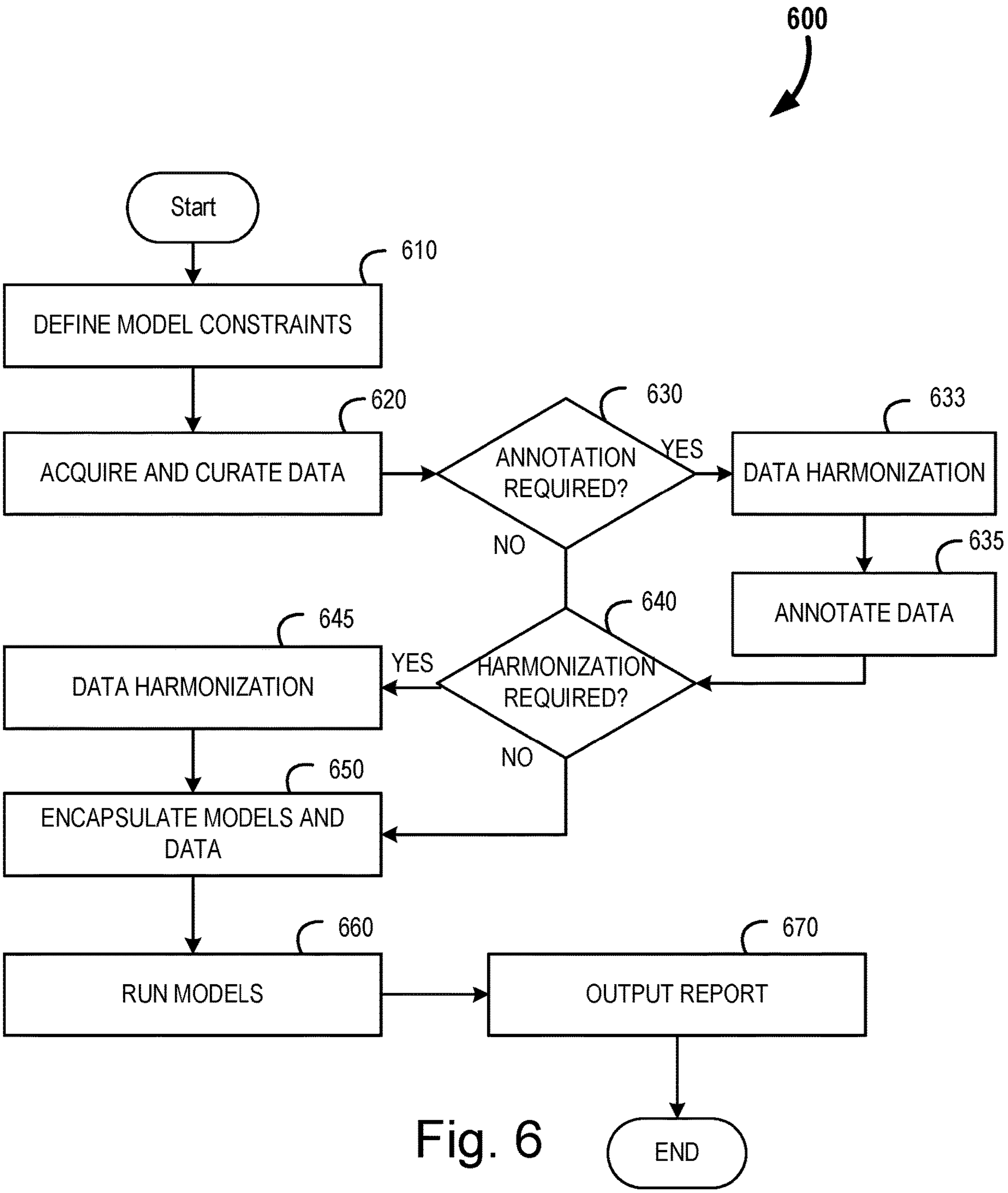
FIG. 6 is a flowchart for an example process for the operation of the zero-trust data processing system, in accordance with some embodiment.

Turning to FIG. 6, one embodiment of the process for deployment and running of algorithms within the sequestered computing nodes is illustrated, at 600. Initially the algorithm developer provides the algorithm to the system. The at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 610) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 7A:
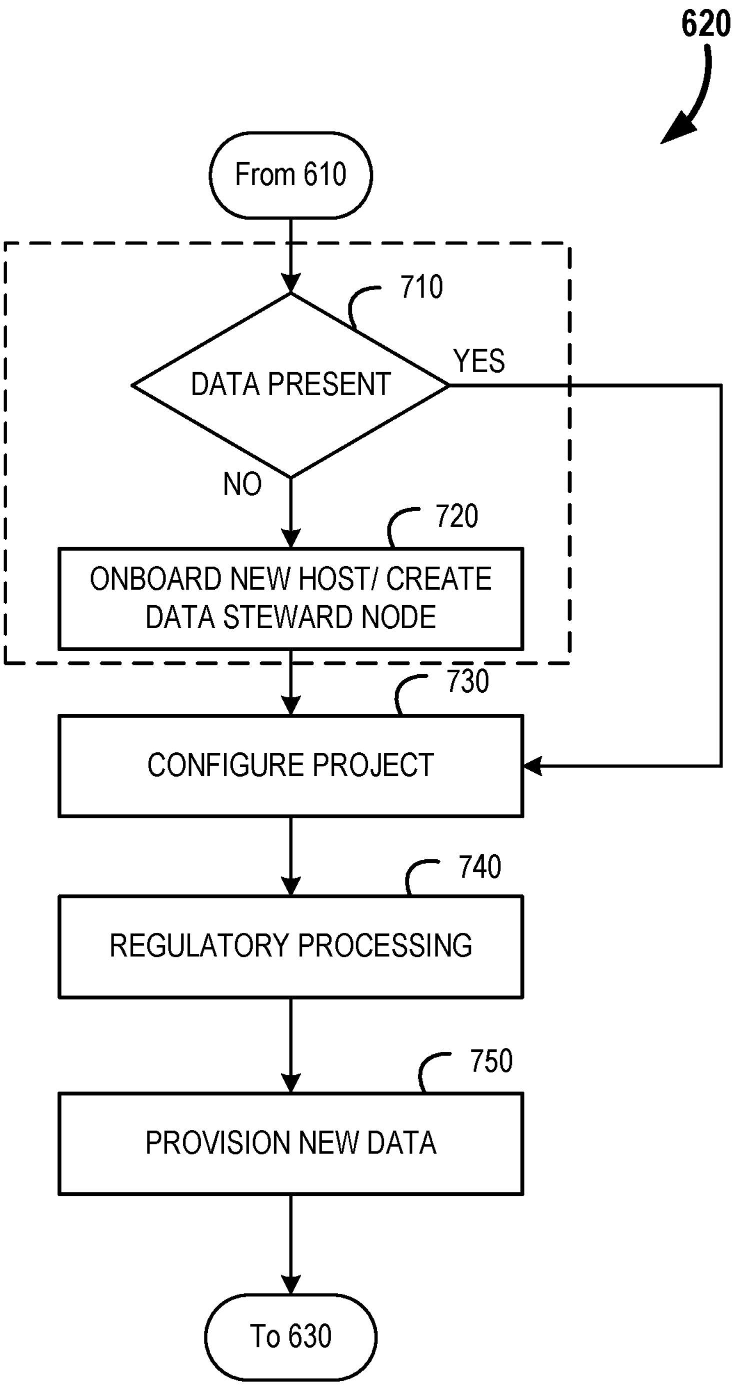
FIG. 7A a flowchart for an example process of acquiring and curating data, in accordance with some embodiment.

Next, data assets that will be subjected to the algorithm(s) are identified, acquired, and curated (at 620). FIG. 7A provides greater detail of this acquisition and curation of the data. Often, the data may include healthcare related data (PHI). Initially, there is a query if data is present (at 710). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 7B:
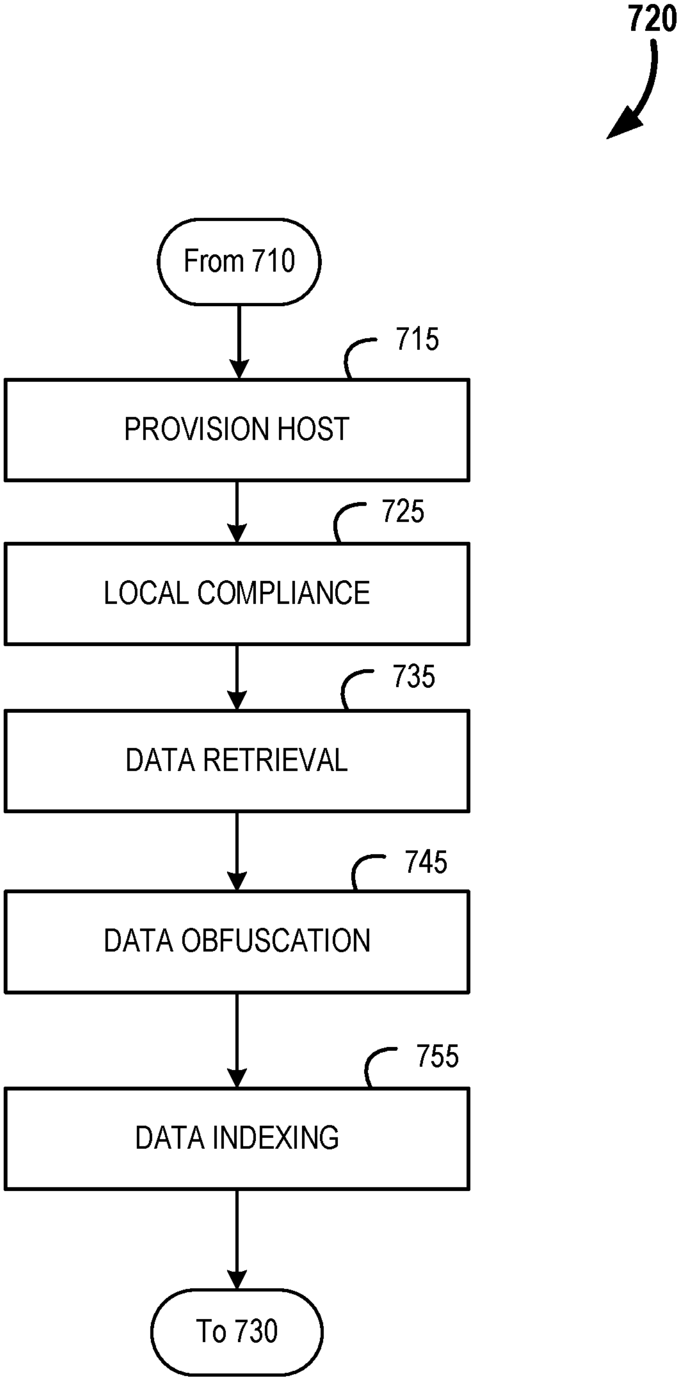
FIG. 7B a flowchart for an example process of onboarding a new host data steward, in accordance with some embodiment.

If the assets are not available, the process generates a new data steward node (at 720). The data query and onboarding activity (surrounded by a dotted line) is illustrated in this process flow of acquiring the data; however, it should be realized that these steps may be performed any time prior to model and data encapsulation (step 650 in FIG. 6). Onboarding/creation of a new data steward node is shown in greater detail in relation to FIG. 7B. In this example process a data host compute and storage infrastructure (e.g., a sequestered computing node as described with respect to FIGS. 1A-5) is provisioned (at 715) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 725). In some instances, the governance and compliance requirements include getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 735). In some instances, the data assets may be transferred from existing storage locations and formats to provisioned storage (physical data stores or cloud-based storage) for use by the sequestered computing node (curated into one or more data stores). The data assets may then be obfuscated (at 745). Data obfuscation is a process that includes data encryption or tokenization, as discussed in much greater detail below. Lastly, the data assets may be indexed (at 755). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 7A, after the creation of the new data steward, the project may be configured (at 730). In some instances, the data steward computer and storage infrastructure is configured to handle a new project with the identified data assets. In some instances, the configuration is performed similarly to the process described of FIG. 7B. Next, regulatory approvals (e.g., IRB and other data governance processes) are completed and documented (at 740). Lastly, the new data is provisioned (at 750). In some instances, the data storage provisioning includes identification and provisioning of a new logical data storage location, along with creation of an appropriate data storage and query structure.

Returning now to FIG. 6, after the data is acquired and configured, a query is performed if there is a need for data annotation (at 630). If so, the data is initially harmonized (at 633) and then annotated (at 635). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 8:
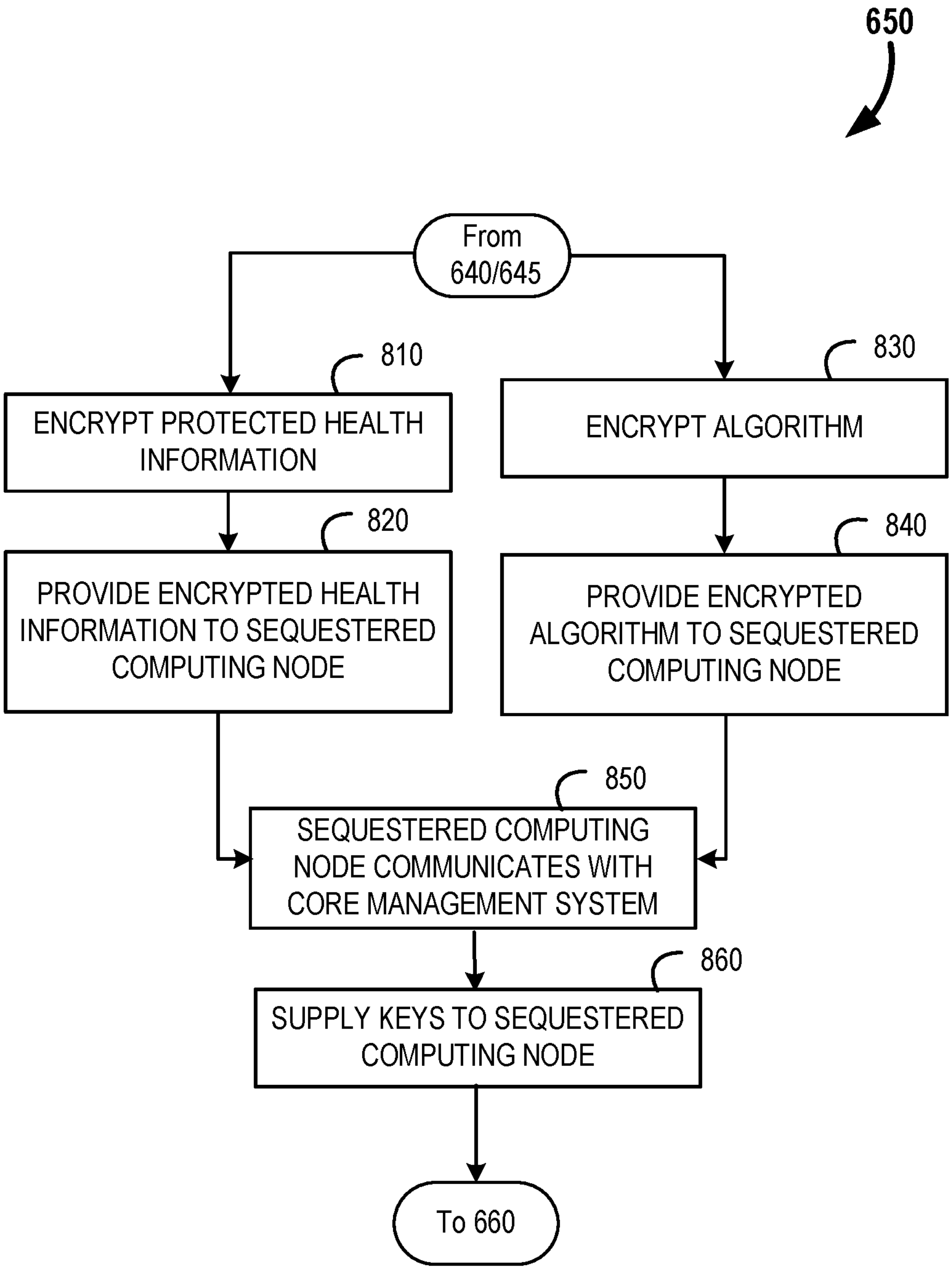
FIG. 8 is a flowchart for an example process of encapsulating the algorithm and data, in accordance with some embodiment.

After annotation, or if annotation was not required, another query determines if additional data harmonization is needed (at 640). If so, then there is another harmonization step (at 645) that occurs in a manner similar to that disclosed above. After harmonization, or if harmonization isn't needed, the models and data are encapsulated (at 650). Data and model encapsulation is described in greater detail in relation to FIG. 8. In the encapsulation process the protected data, and the algorithm are each encrypted (at 810 and 830 respectively). In some embodiments, the data is encrypted either using traditional encryption algorithms (e.g., RSA) or homomorphic encryption.

Next the encrypted data and encrypted algorithm are provided to the sequestered computing node (at 820 and 840 respectively). There processes of encryption and providing the encrypted payloads to the sequestered computing nodes may be performed asynchronously, or in parallel. Subsequently, the sequestered computing node may phone home to the core management node (at 850) requesting the keys needed. These keys are then also supplied to the sequestered computing node (at 860), thereby allowing the decryption of the assets.

Returning again to FIG. 6, once the assets are all within the sequestered computing node, they may be decrypted and the algorithm may run against the dataset (at 660). The results from such runtime may be outputted as a report (at 670) for downstream consumption.

Figure 9:
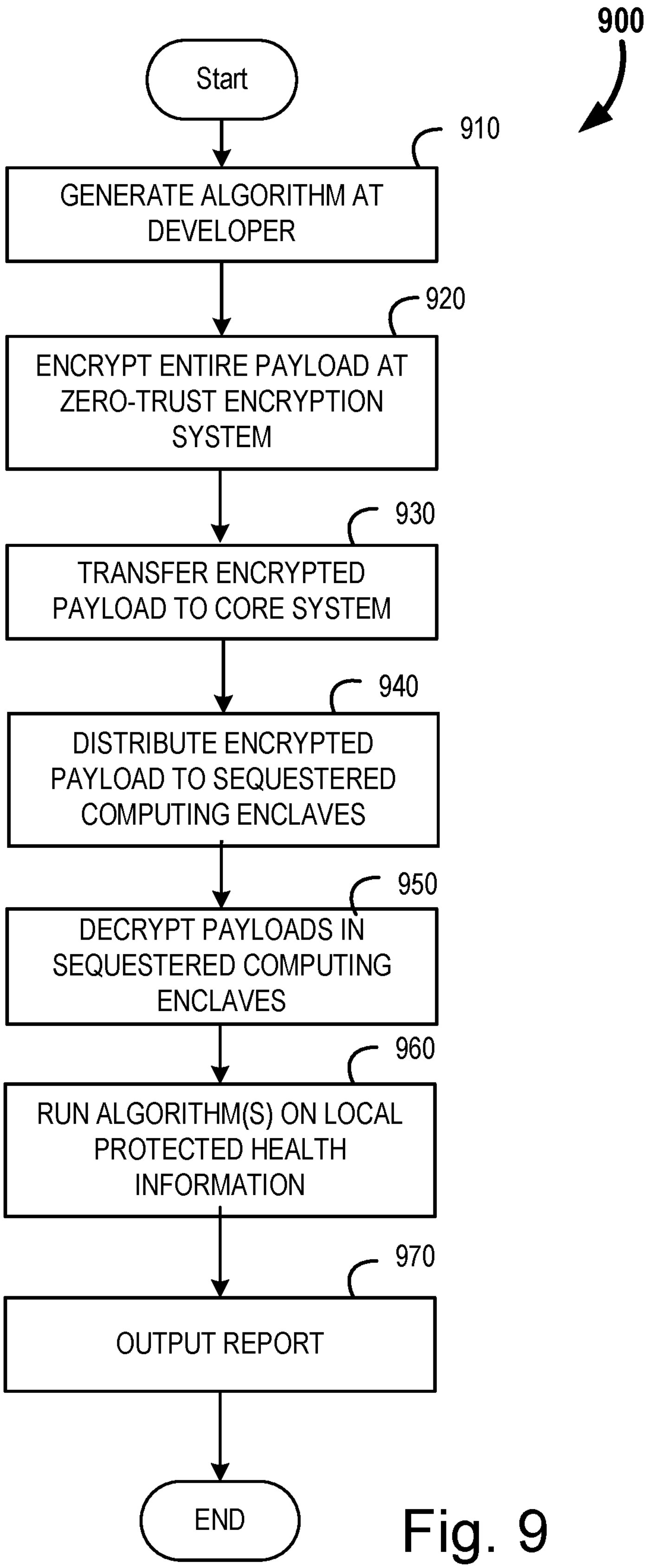
FIG. 9 is a flowchart for an example process of a first model of algorithm encryption and handling, in accordance with some embodiment.

Turning now to FIG. 9, a first embodiment of the system for zero-trust processing of the data assets by the algorithm is provided, at 900. In this example process, the algorithm is initially generated by the algorithm developer (at 910) in a manner similar to that described previously. The entire algorithm, including its container, is then encrypted (at 920), using a public key, by the encryption server within the zero-trust system of the algorithm developer's infrastructure. The entire encrypted payload is provided to the core management system (at 930). The core management system then distributes the encrypted payload to the sequestered computing enclaves (at 940).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 950).

After decryption within the sequestered computing node, the algorithm(s) are run (at 960) against the protected health information (or other sensitive information based upon the given use case). The results are then output (at 970) to the appropriate downstream audience (generally the data steward, but may include public health agencies or other interested parties).

Figure 10:
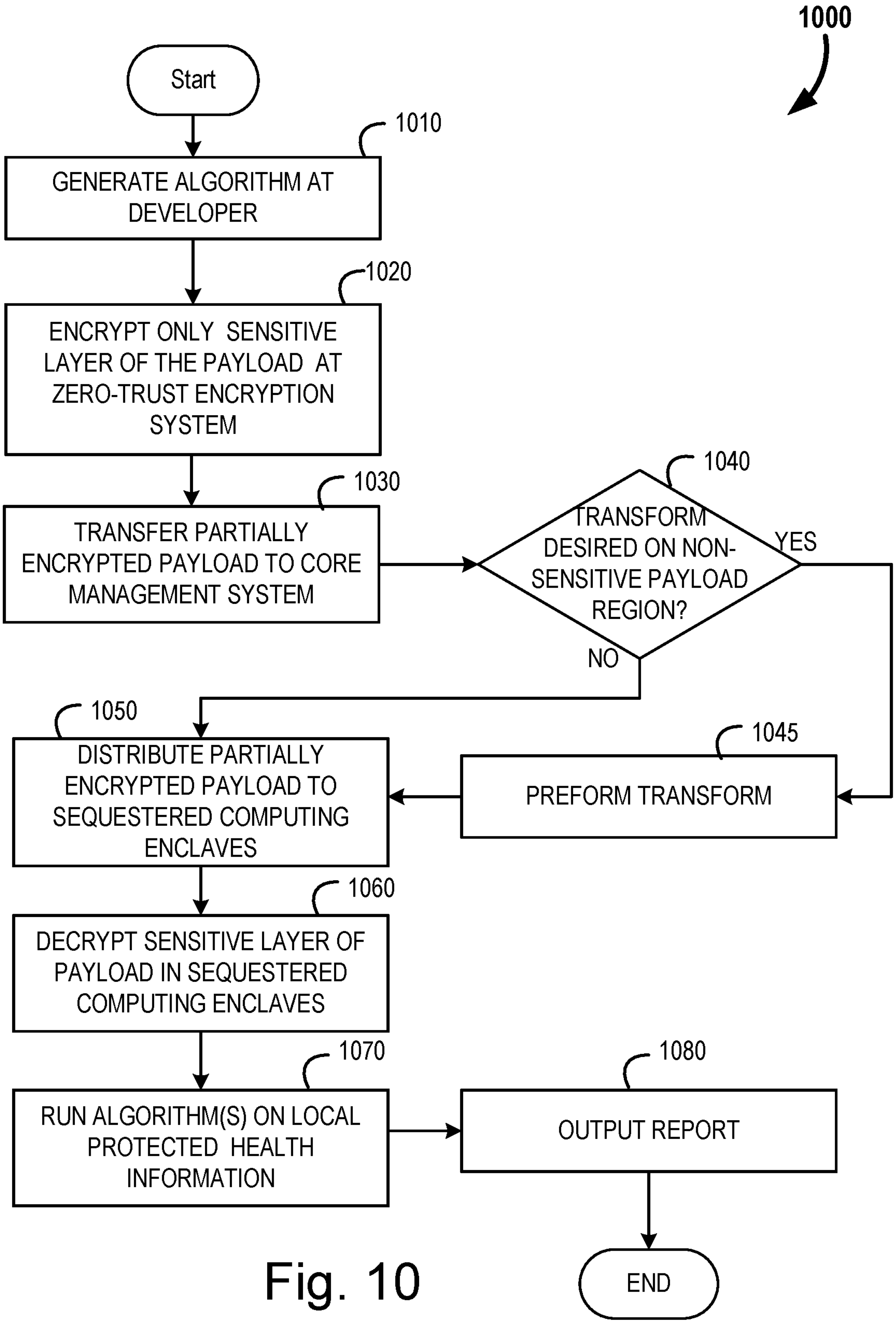
FIG. 10 is a flowchart for an example process of a second model of algorithm encryption and handling, in accordance with some embodiments.

FIG. 10, on the other hand, provides another methodology of zero-trust computation that has the advantage of allowing some transformation of the algorithm data by either the core management system or the data steward themselves, shown generally at 1000. As with the prior embodiment, the algorithm is initially generated by the algorithm developer (at 1010). However, at this point the two methodologies diverge. Rather than encrypt the entire algorithm payload, it differentiates between the sensitive portions of the algorithm (generally the algorithm weights), and non-sensitive portions of the algorithm (including the container, for example). The process then encrypts only layers of the payload that have been flagged as sensitive (at 1020).

The partially encrypted payload is then transferred to the core management system (at 1030). At this stage a determination is made whether a modification is desired to the non-sensitive, non-encrypted portion of the payload (at 1040). If a modification is desired, then it may be performed in a similar manner as discussed previously (at 1045).

If no modification is desired, or after the modification is performed, the payload may be transferred (at 1050) to the sequestered computing node located within the data steward infrastructure (or a third party). Although not illustrated, there is again an opportunity at this stage to modify any non-encrypted portions of the payload when the algorithm payload is in the data steward's possession.

Next, the keys unique to the sequestered computing node are employed to decrypt the sensitive layer of the payload (at 1060), and the algorithms are run against the locally available protected health information (at 1070). In the use case where a third party is hosting the sequestered computing node, the protected health information may be encrypted at the data steward before being transferred to the sequestered computing node at said third party. Regardless of sequestered computing node location, after runtime, the resulting report is outputted to the data steward and/or other interested party (at 1080).

Figure 11:
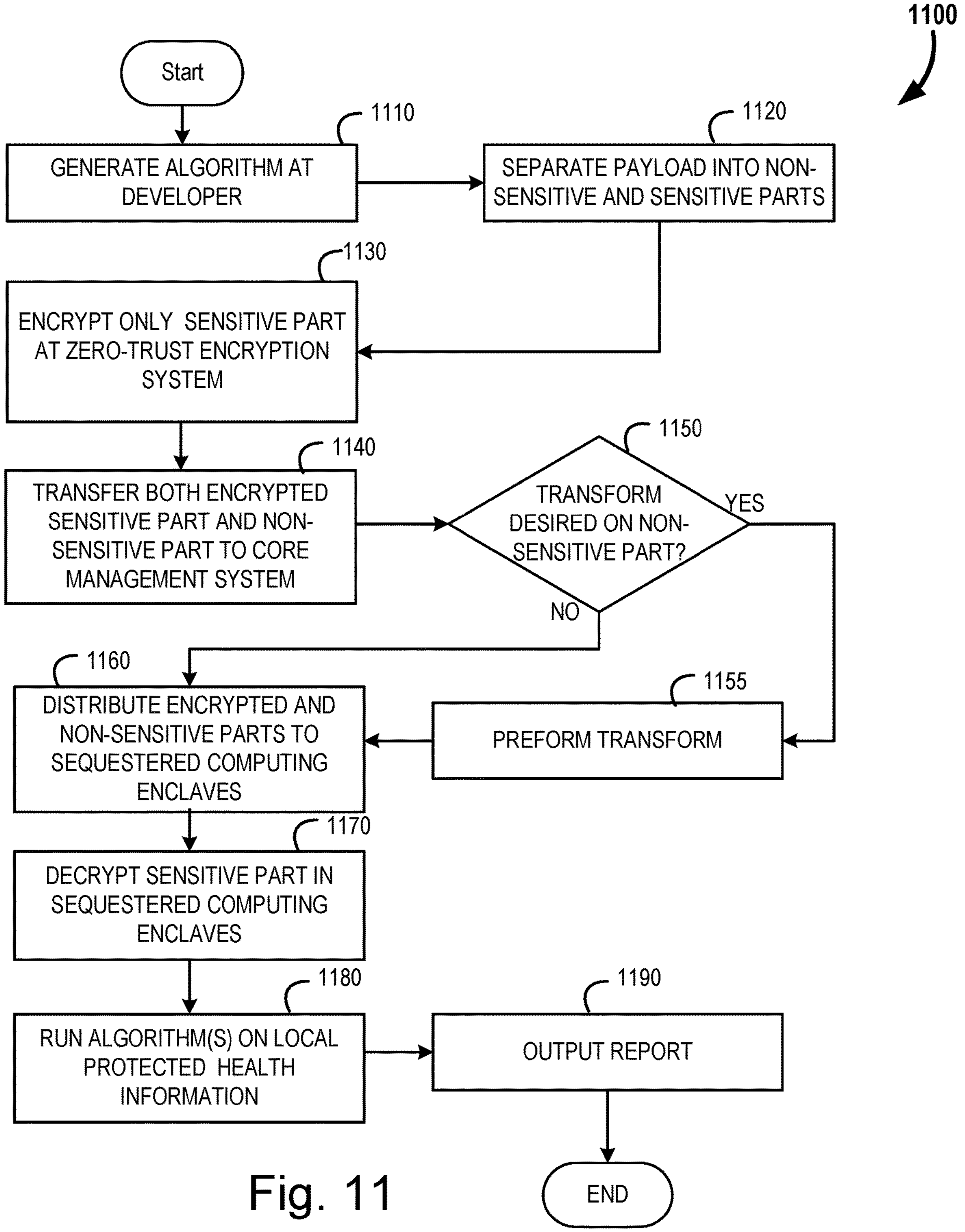
FIG. 11 is a flowchart for an example process of a third model of algorithm encryption and handling, in accordance with some embodiments.

FIG. 11, as seen at 1100, is similar to the prior two figures in many regards. The algorithm is similarly generated at the algorithm developer (at 1110); however, rather than being subject to an encryption step immediately, the algorithm payload may be logically separated into a sensitive portion and a non-sensitive portion (at 1120). To ensure that the algorithm runs properly when it is ultimately decrypted in the (sequestered) sequestered computing enclave, instructions about the order in which computation steps are carried out may be added to the unencrypted portion of the payload.

Subsequently, the sensitive portion is encrypted at the zero-trust encryption system (at 1130), leaving the non-sensitive portion in the clear. Both the encrypted portion and the non-encrypted portion of the payload are transferred to the core management system (at 1140). This transfer may be performed as a single payload, or may be done asynchronously. Again, there is an opportunity at the core management system to perform a modification of the non-sensitive portion of the payload. A query is made if such a modification is desired (at 1150), and if so it is performed (at 1155). Transformations may be similar to those detailed above.

Subsequently, the payload is provided to the sequestered computing node(s) by the core management system (at 1160). Again, as the payload enters the data steward node(s), it is possible to perform modifications to the non-encrypted portion(s). Once in the sequestered computing node, the sensitive portion is decrypted (at 1170), the entire algorithm payload is run (at 1180) against the data that has been provided to the sequestered computing node (either locally or supplied as an encrypted data package). Lastly, the resulting report is outputted to the relevant entities (at 1190).

Any of the above modalities of operation provide the instant zero-trust architecture with the ability to process a data source with an algorithm without the ability for the algorithm developer to have access to the data being processed, the data steward being unable to view the algorithm being used, or the core management system from having access to either the data or the algorithm. This uniquely provides each party the peace of mind that their respective valuable assets are not at risk, and facilitates the ability to easily, and securely, process datasets.

Figure 12:
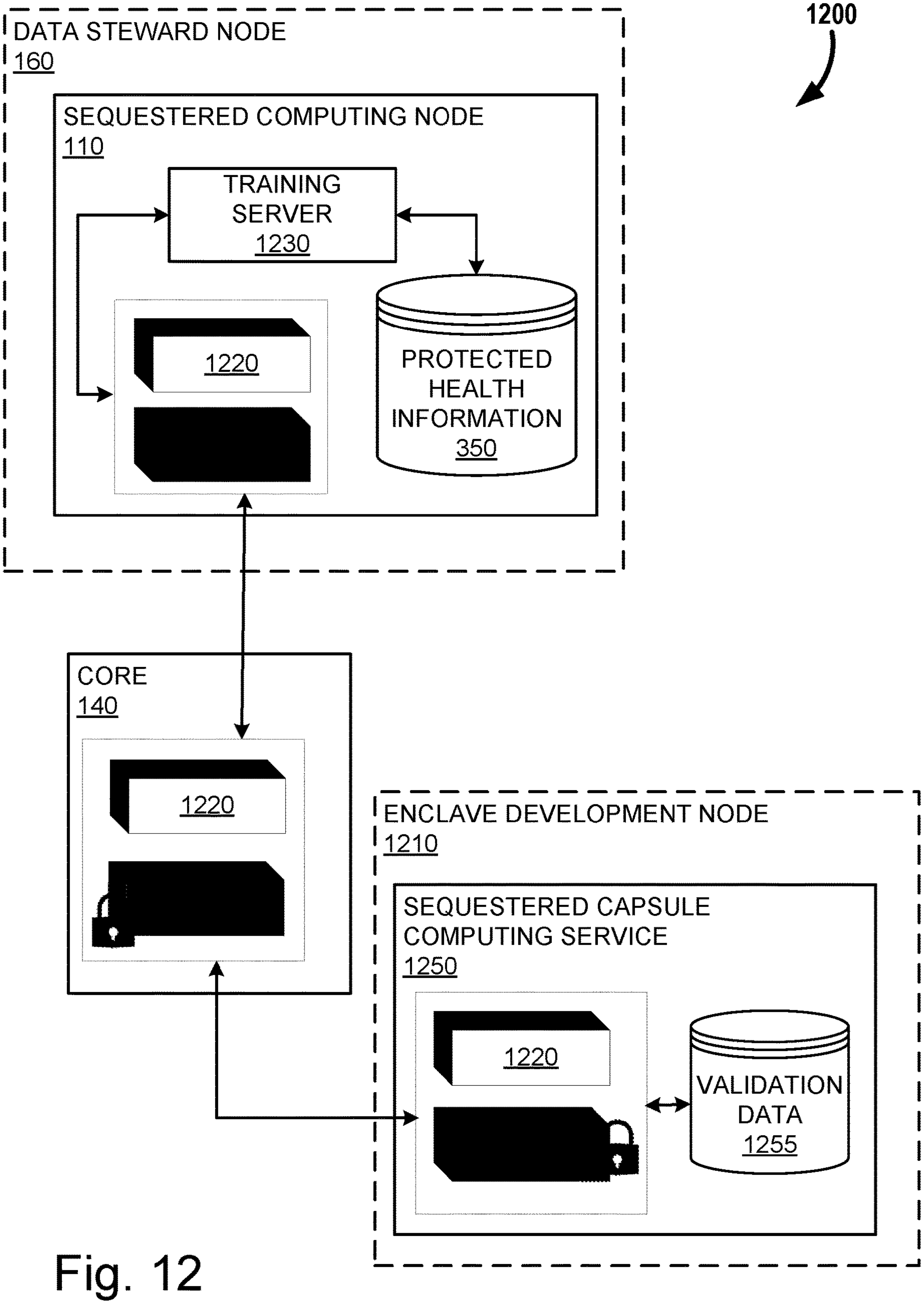
FIG. 12 is an example block diagram showing the training of the model within a zero-trust environment, in accordance with some embodiments.

Turning now to FIG. 12, a system for zero-trust training of algorithms is presented, generally at 1200. Traditionally, algorithm developers require training data to develop and refine their algorithms. Such data is generally not readily available to the algorithm developer due to the nature of how such data is collected, and due to regulatory hurdles. As such, the algorithm developers often need to rely upon other parties (data stewards) to train their algorithms. As with running an algorithm, training the algorithm introduces the potential to expose the algorithm and/or the datasets being used to train it.

In this example system, the nascent algorithm is provided to the sequestered computing node 110 in the data steward node 160. This new, untrained algorithm may be prepared by the algorithm developer (not shown) and provided in the clear to the sequestered computing node 110 as it does not yet contain any sensitive data. The sequestered computing node leverages the locally available protected health information 350, using a training server 1230, to train the algorithm. This generates a sensitive portion of the algorithm 1225 (generally the weights and coefficients of the algorithm), and a non-sensitive portion of the algorithm 1220. As the training is performed within the sequestered computing node 110, the data steward 160 does not have access to the algorithm that is being trained. Once the algorithm is trained, the sensitive portion 1225 of the algorithm is encrypted prior to being released from the sequestered computing enclave 110. This partially encrypted payload is then transferred to the data management core 140, and distributed to a sequestered capsule computing service 1250, operating within an enclave development node 1210. The enclave development node is generally hosted by one or more data stewards.

The sequestered capsule computing node 1250 operates in a similar manner as the sequestered computing node 110 in that once it is "locked" there is no visibility into the inner workings of the sequestered capsule computing node 1250. As such, once the algorithm payload is received, the sequestered capsule computing node 1250 may decrypt the sensitive portion of the algorithm 1225 using a public-private key methodology. The sequestered capsule computing node 1250 also has access to validation data 1255. The algorithm is run against the validation data, and the output is compared against a set of expected results. If the results substantially match, it indicates that the algorithm is properly trained, if the results do not match, then additional training may be required.

Figure 13:
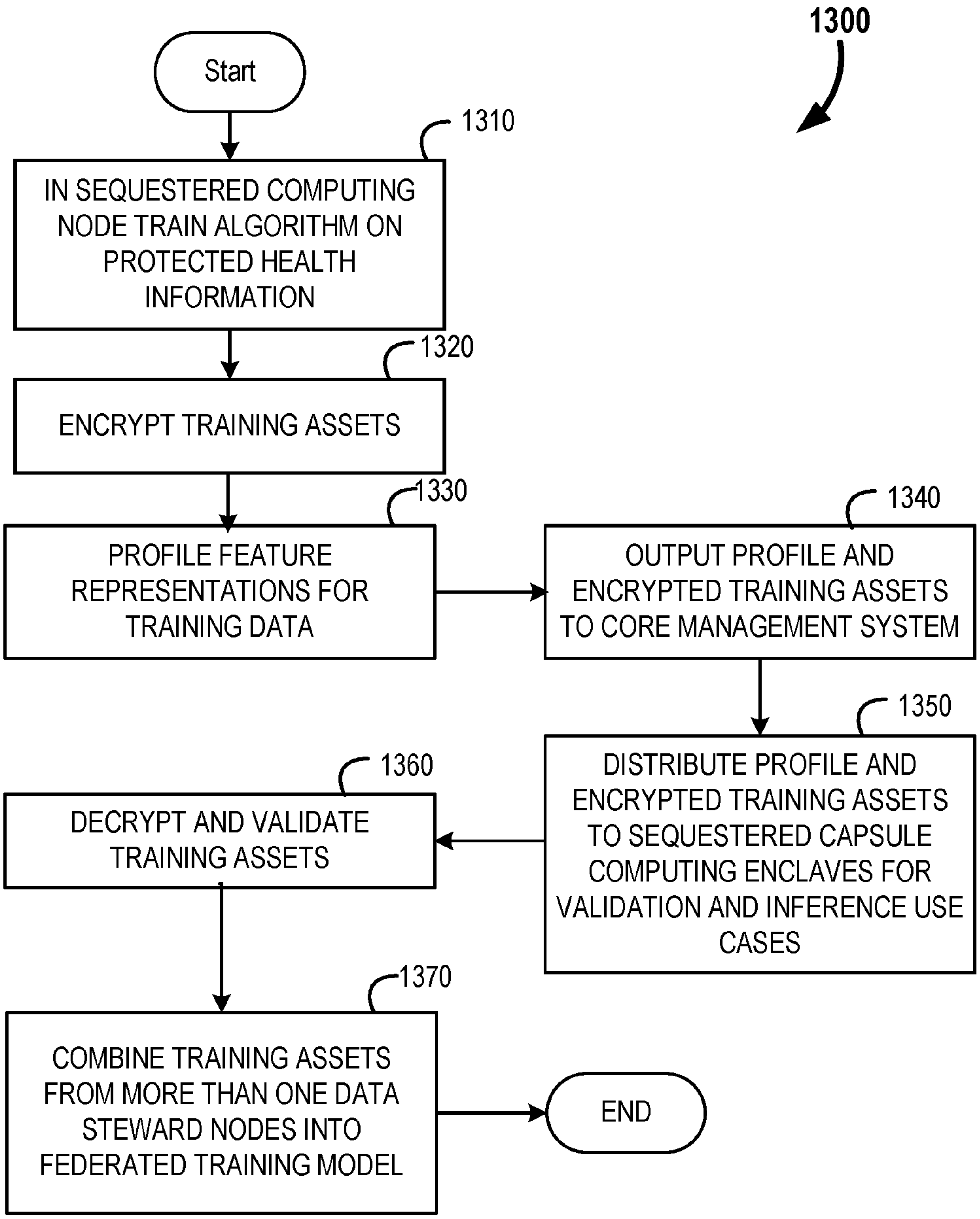
FIG. 13 is a flowchart for an example process of training of the model within a zero-trust environment, in accordance with some embodiments.

FIG. 13 provides the process flow, at 1300, for this training methodology. In the sequestered computing node, the algorithm is initially trained (at 1310). The training assets (sensitive portions of the algorithm) are encrypted within the sequestered computing node (at 1320). Subsequently the feature representations for the training data are profiled (at 1330). One example of a profiling methodology would be to take the activations of the certain AI model layers for samples in both the training and test set, and see if another model can be trained to recognize which activations came from which dataset. These feature representations are non-sensitive, and are thus not encrypted. The profile and the encrypted data assets are then output to the core management system (at 1340) and are distributed to one or more sequestered capsule computing enclaves (at 1350). At the sequestered capsule computing node, the training assets are decrypted and validated (at 1360). After validation the training assets from more than one data steward node are combined into a single featured training model (at 1370). This is known as federated training.

Figure 14:
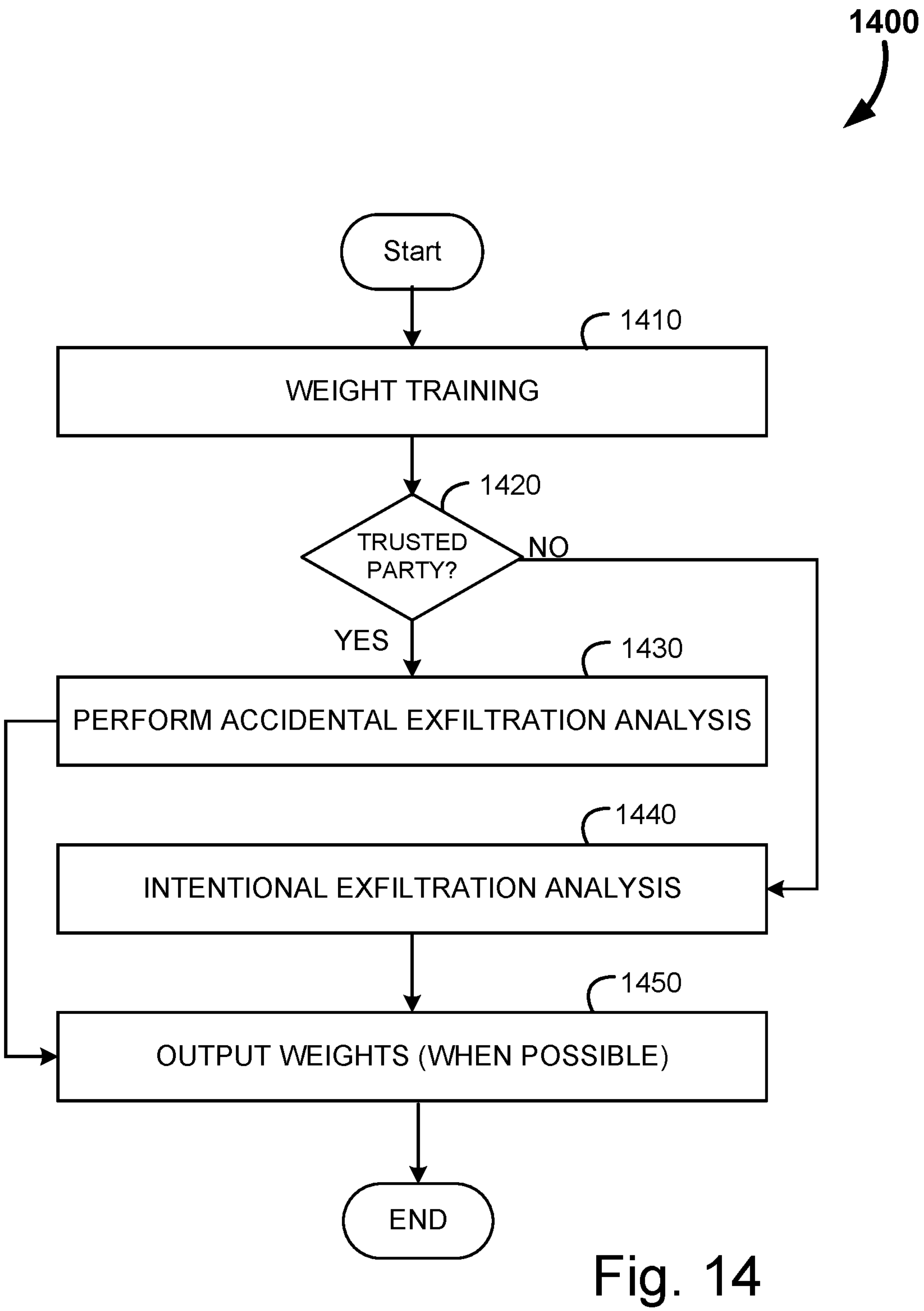
FIG. 14 is a flowchart for an example process of weight analysis, in accordance with some embodiments.

Turning now to FIG. 14 which provides a flowchart for an example process 1400 of data exfiltration analysis, initially an algorithm is provided by the developer, through the management core, to the data steward. The algorithm remains encrypted until substantiated within the sequestered computing node. Protected data is then provided to the sequestered computing node as well, and the algorithm may be able to process the data. In addition to being able to process the data, the runtime server is capable of training the algorithm on the data (at 1410). Training is an integral part of generating viable AI models, and it is of upmost importance for the algorithm developer to be able to access the large volumes of training data available from the data stewards. One drawback of such training, however, is that a weight matrix can function as a vast distributed memory store. With sufficient numbers of weights (and many models may have vast numbers of weights) the storage capacity of these weight spaces can be enormous. As such, there is very real concern from data stewards that in the training process, the algorithms may store the underlying data within their weight space, either intentionally or inadvertently.

Initially, after training the model, a determination may be made whether the algorithm developer is "trusted" or not (at 1420). Generally, the reputation (or lack thereof) is determinative of whether the algorithm developer is to be trusted. For example, the Mayo Clinic has a stellar reputation, and the risk of purposeful exfiltration of data from an algorithm they develop is extremely low. A startup algorithm developer, on the other hand, may lack any reputation, and may be subjected to increased scrutiny based upon the possibility they could purposefully attempt to exfiltrate protected data. Other factors, beyond reputation, may be utilized to determine if the algorithm developer is to be trusted—these may include country of the algorithm developer, ownership status, conflicting interests within the corporate structure of the algorithm developer, and the like.

When an algorithm developer is considered 'trusted', the system may undergo an accidental exfiltration analysis (at 1430). Even developers with the best intentions sometimes generate models that inadvertently memorize or otherwise store data from the datasets that are being used to train the algorithm. Such memorizations, while still detrimental, are generally simple to detect and resolve. For this reason, a bifurcated exfiltration analysis is performed, whereby the trusted algorithm developers are subjected to significantly lower cost analysis as compared to actors that may be malicious. The term 'cost' as used herein refers to computational resources, memory loads, and time required to perform the exfiltration analysis. In some embodiments, the sequestered computing nodes, due to their substantiation, have limited computing resources available. Exfiltration analysis, on the other hand may be extremely computationally demanding. Thus, prioritization and alternate workflows for the exfiltration analysis in order to improve the computer functioning of the sequestered computing node is often required, or at least preferred, for satisfactory operation.

Figure 15:
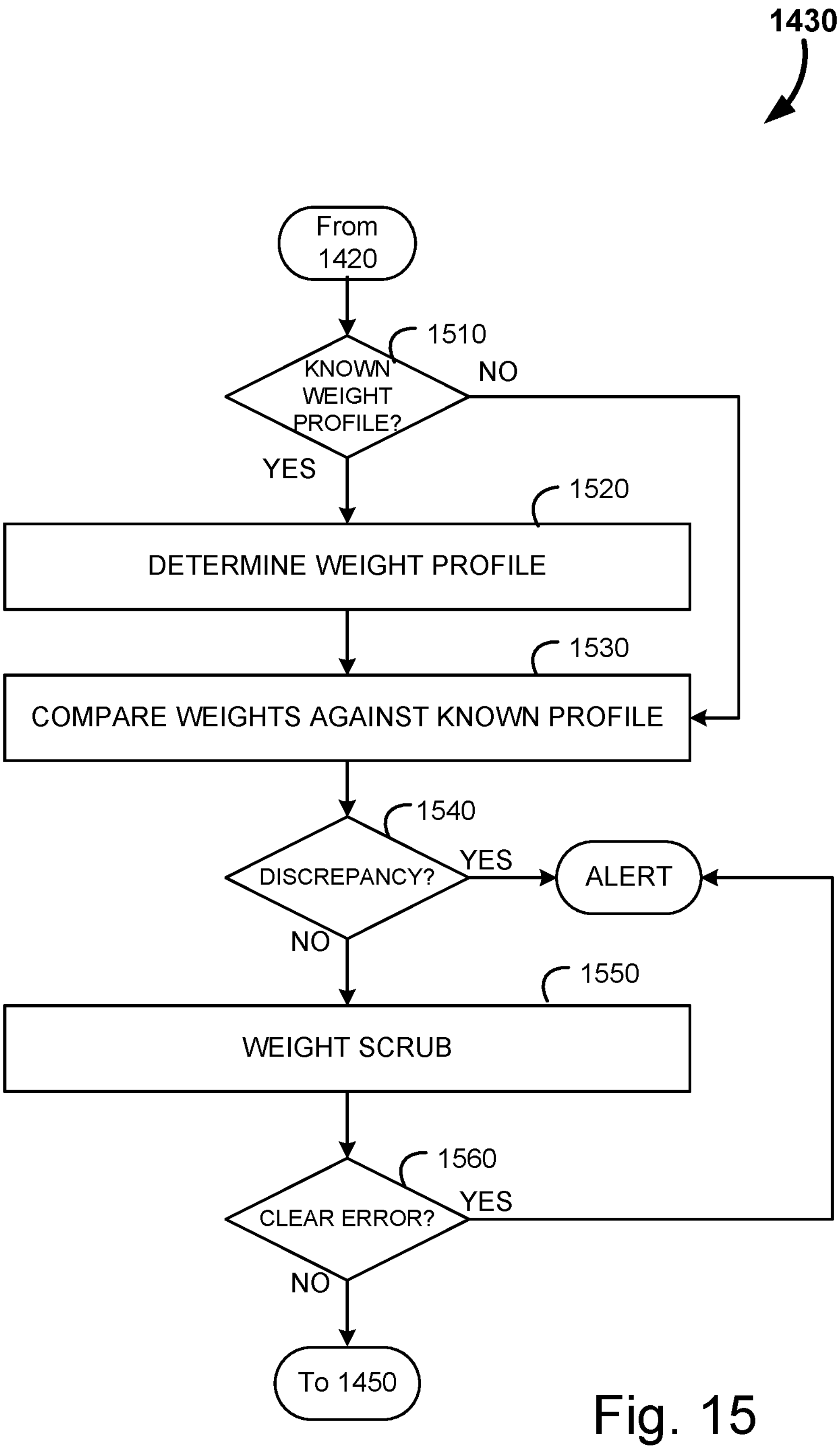
FIG. 15 is a flow diagram for the example process of accidental data exfiltration analysis, in accordance with some embodiments.

The lower computationally demanding process for accidental exfiltration analysis is provided in greater detail in relation to FIG. 15. In this process, a determination is made if the weight profile for the given algorithm is known (at 1510). Different algorithms have different behaviors for their weights. When the system is confronted with an algorithm that it has already profiled, or which is very similar to a profiled algorithm, the system may directly progress to comparing the trained weights against the known profile (at 1530). In contrast, if the algorithm is new to the system, the weight profile for the given algorithm is initially determined (at 1520) before being compared against the trained weights. It should be expected that some changes in the distributions of the values of weights as they memorize raw data. Starting with a multitude of different trained models, they would be trained to work on memorization tasks. A second model, the "memorization detector" would be trained to detect model weight tensors that were memorizing data.

When there is a discrepancy (at 1540) between the profiled weights versus the trained weights, the system throws an alert. The weighted trained algorithm is prevented from exiting the sequestered computing node, and an alert regarding the exfiltration event is provided to the algorithm developer. This enables the algorithm developer to review the algorithm and implement fixes to rectify the exfiltration behavior. The modified model may then undergo a retraining event and be re-analyzed for exfiltration until the issue is resolved. In alternate embodiments, the system may rely upon the improvement module to provide feedback, which does not include weight outputs, to assist in model performance improvements, as will be discussed in greater detail below.

However, if no evidence of data exfiltration is found, the next stage is to perform a weight scrubbing (at 1550). This scrubbing process includes basic scrubbing of the weights for exact copies of the processed data. In some advanced methods, weight entries that mimic the data (but which are not exact copies) due to consistent transformations may likewise be identified. This may be performed by profiling the data and looking for patterns in the weights that mirror patterns in the underlying data. If such a pattern is identified, a check for a transform is performed for an entry. If a transform is identified, it may be employed on other data records, and if the results are consistent (e.g., the other data points reflect in the stored weights) then a flag for data exfiltration may be generated. The process identifies when such clear errors occur (at 1560) and generates an alert as previously discussed. When no exfiltration events are identified, the process returns to FIG. 14, and the trained algorithm (with trained weights) may be returned to the algorithm developer (at 1450).

Figure 16:
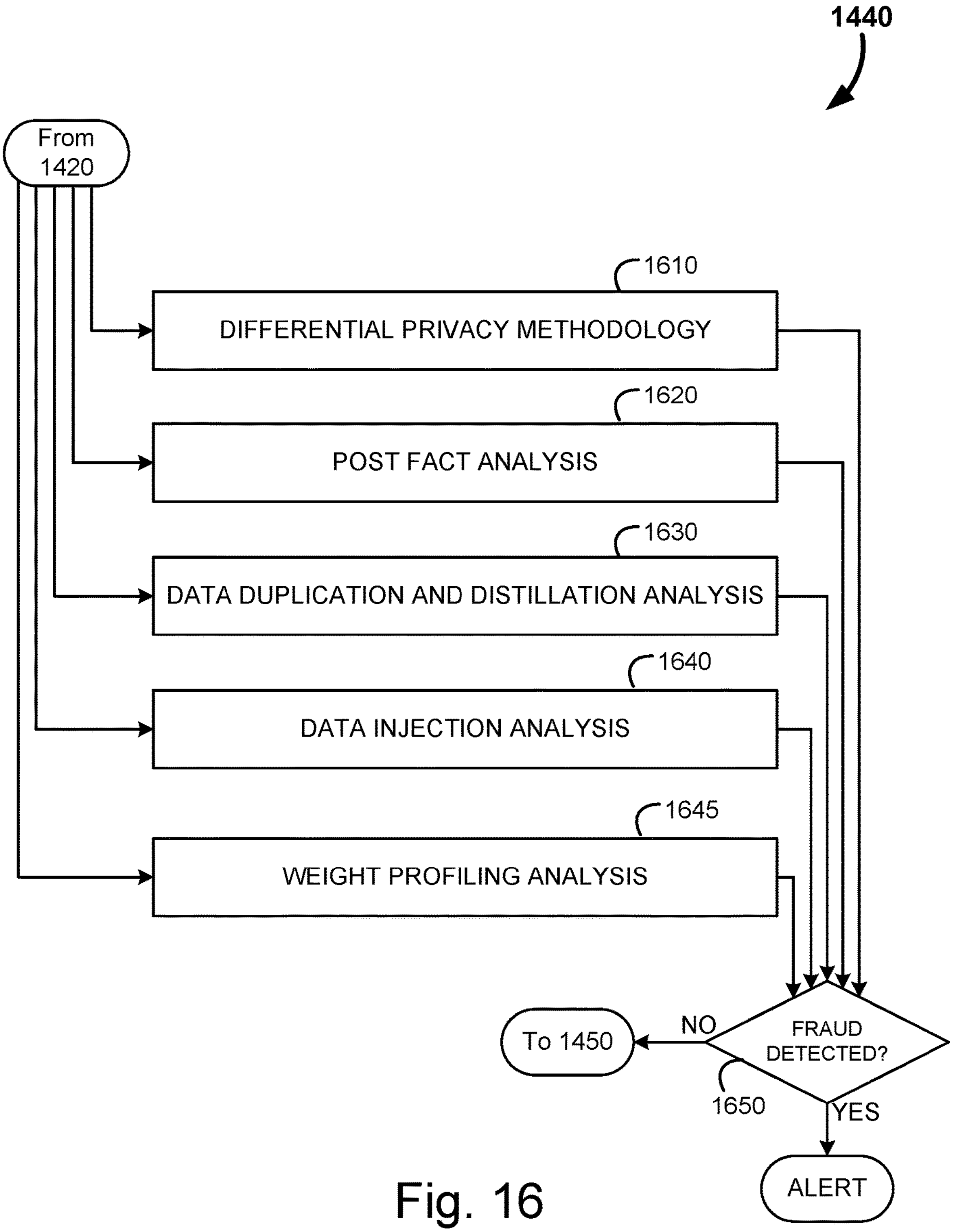
FIG. 16 is a flow diagram for the example process of intentional data exfiltration analysis, in accordance with some embodiments.

In the event that the algorithm developer is not determined to be a trusted entity, the system may have to resort to a more computationally intensive intentional exfiltration analysis (at 1440). Intentional exfiltration analysis, which is presented in greater detail in relation to FIG. 16, may include one or more of more sophisticated (and generally more computationally intensive) weight analysis procedures. These include differential privacy methodologies (at 1610), post fact analysis (at 1620), data duplication and/or distillation analysis (at 1630), data injection analysis (at 1640) and weight profiling analysis (at 1645). With intentional exfiltration, it is possible to distribute the data among the weight space, apply transforms, and perform other obfuscating techniques to attempt to conceal the exfiltration of the data. As such, these methodologies are designed to look for model weight patterns, as opposed to weight values, in order to identify exfiltration events. It should also be noted that, in some situations, it may be beneficial to initially perform unintentional exfiltration analysis before an intentional exfiltration analysis is done. This is due to the fact that many times, exfiltration is performed by mistake, and by being able to catch these instances with less computationally demanding techniques, the entire process may be optimized for greater efficiency.

In some embodiments, all these techniques may be employed to identify exfiltration events in parallel. In other embodiments, these exfiltration analyses may be serially employed based upon computational intensity (from least intensive to most) in hopes of catching any exfiltration events with the least computational cost. In other embodiments, only some subset of these exfiltration analyses may be employed. In some cases, the relative 'trustworthiness' of the algorithm developer may be relied upon to determine which subset of analyses are employed.

Regardless of technique(s) employed, when an exfiltration/fraud event is identified (at 1650), an alert is given, and in some embodiments information regarding the exfiltration event is provided to the algorithm developer. This enables the algorithm developer to review the algorithm and implement fixes to rectify the exfiltration behavior. In other situations, when it is suspected that the algorithm developer is very purposefully engaging in an exfiltration attempt, the system may not inform the algorithm developer, and instead register a failure of the algorithm. The algorithm developer may then be added to a 'blacklist' in order to ensure all future algorithms received from them are subjected to enhanced scrutiny and/or they may be barred from engaging the system in the future. As noted before, it is also possible for the system to rely upon the improvement module to provide feedback, which does not include weight outputs, to assist in model performance improvements, as will be discussed in greater detail below.

Figure 17:
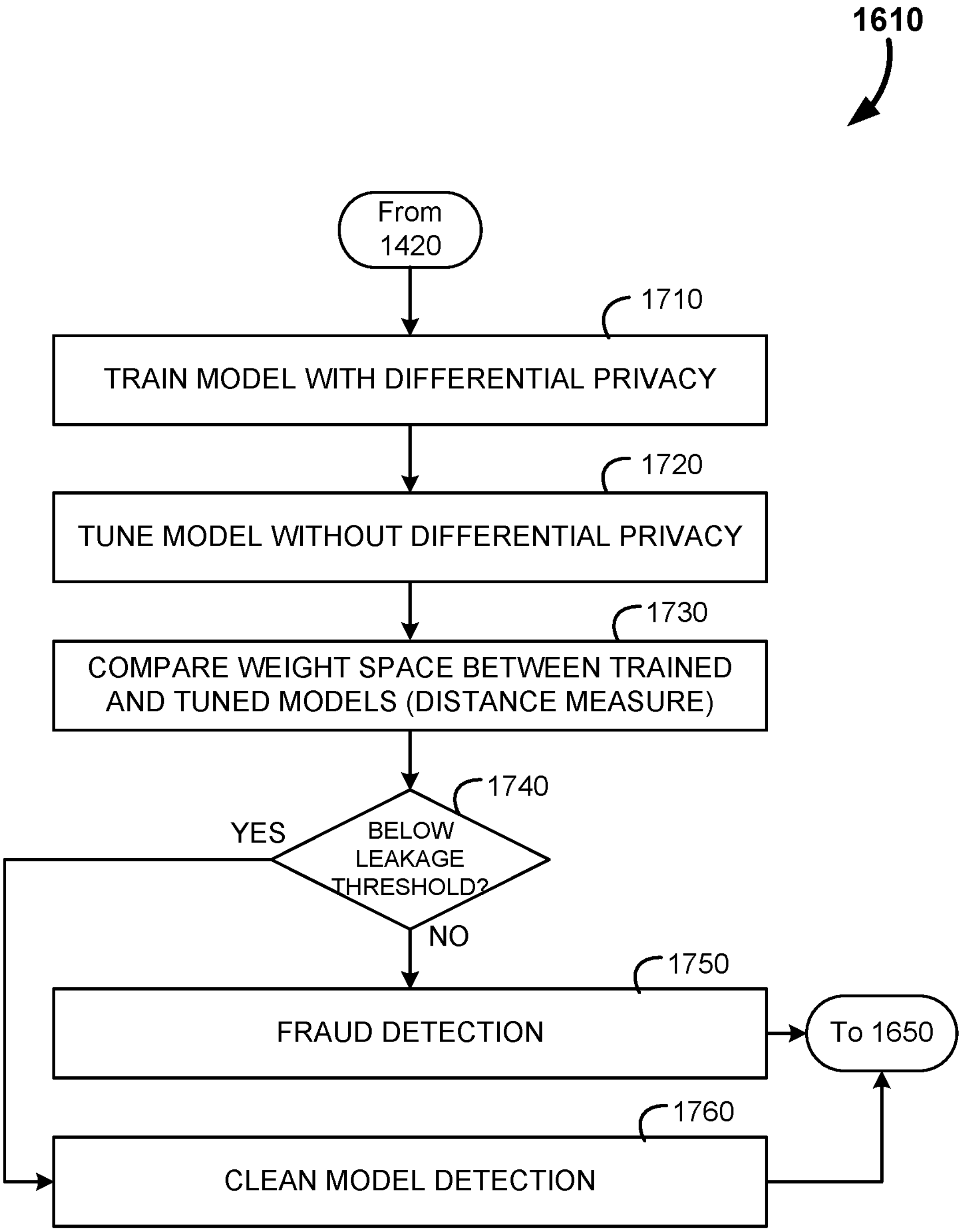
FIG. 17 is a flow diagram for the example process of exfiltration analysis using differential privacy techniques, in accordance with some embodiments.

Turning to FIG. 17, the differential privacy methodology for exfiltration analysis is provided in greater detail. In this example process, the model is trained with differential privacy (at 1710). Essentially this means that salt is added to the dataset in order to obscure what is 'real' data versus synthetic data. The model, after this gross training, may then be tuned with non-salted true data (at 1720). The weight space between the trained model and the tuned model, as a distance measurement, is then compared (at 1730).

For models that do not store data, the tuned model's weights and the trained model's weights should be relatively similar. When the model is concealing underlying data however, the weights will vary to a larger degree. As such, the leakage level of the weight comparison is contrasted against a set threshold (at 1740). For example, the system may build models that exfiltrate data and compare with technically vetted models. As described previously, a difference threshold could be computed directly from memorization tasks, as described above for the setup of the memorization detector model. The memorization detector model strategy could also be used directly to identify when data is being stored directly in the weight tensor. In this embodiment, the thresholding is done implicitly by the memorization detector model. When the leakage is below the threshold this indicates that the model is 'clean', meaning there is a low likelihood that any data is being exfiltrated (at 1760). However, leakage above the threshold indicates a fraud attempt (at 1750) which includes an alert and withholding of the trained model from the algorithm developer.

Figure 18:
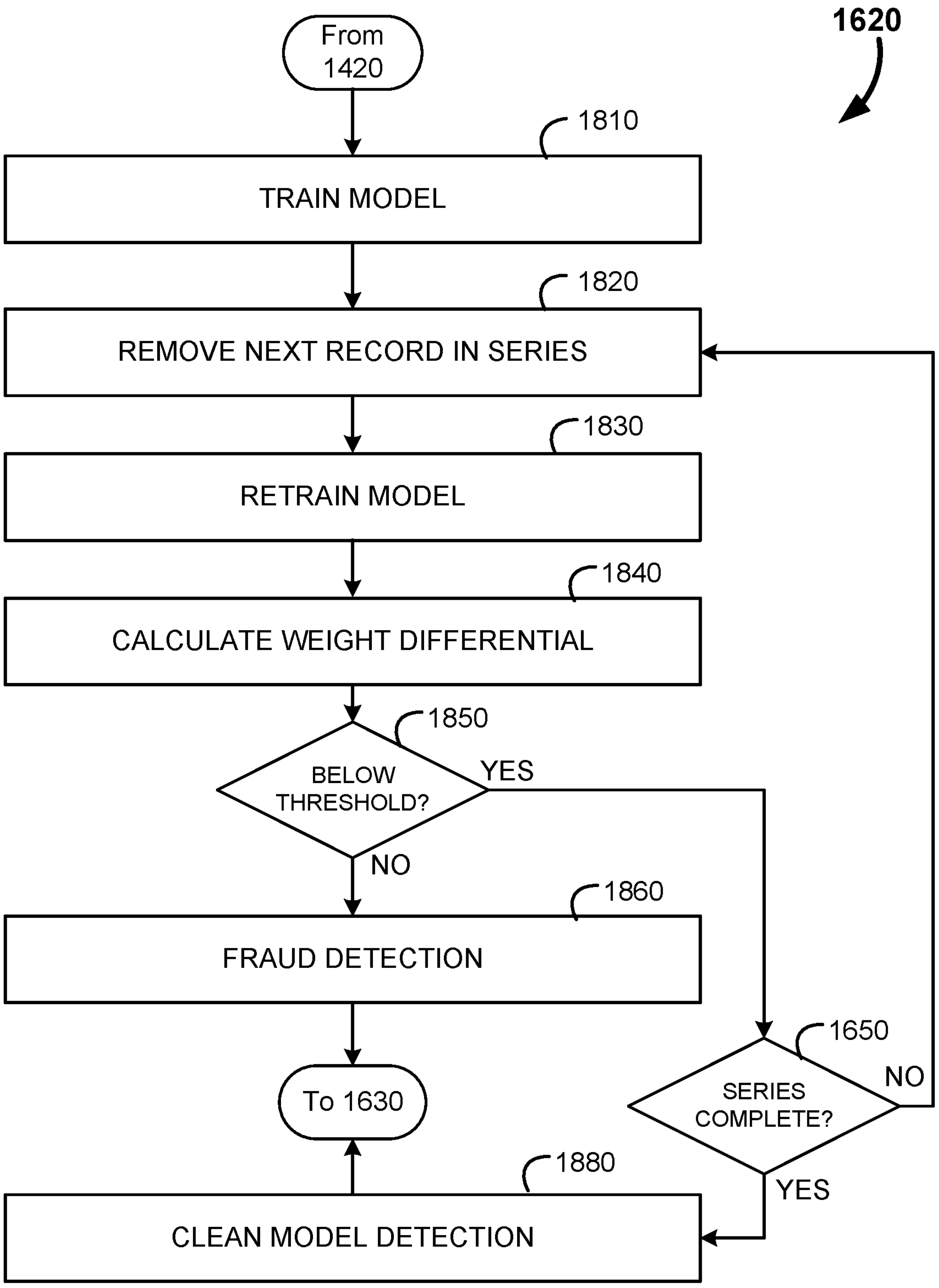
FIG. 18 is a flow diagram for the example process of exfiltration analysis using post fact techniques, in accordance with some embodiments.

Turning to FIG. 18, the method for post fact analysis is presented in greater detail. In this computationally demanding method, the system first trains the model on the dataset (at 1810). The first record from the dataset is then removed (at 1820) and the model is retrained (at 1830). The weight differential between the originally trained model, and the model with the record removed is determined (at 1840). If the differential is below a configured threshold (at 1850) then the process continued by determining if the record that was removed was the final record in the series (at 1650). If not, the process repeats. This occurs for every single record in the dataset, requiring repeated model training. For this reason, the post fact analysis, while very thorough, tends to be resource intensive.

If, after all records are thus processes, all weight differentials are below the configured threshold, this may indicate that the model is free from exfiltration attempts (at 1880). However, when one or more weights are above the threshold, this may indicate a fraud attempt (at 1860) and throw an alert.

Figure 19:
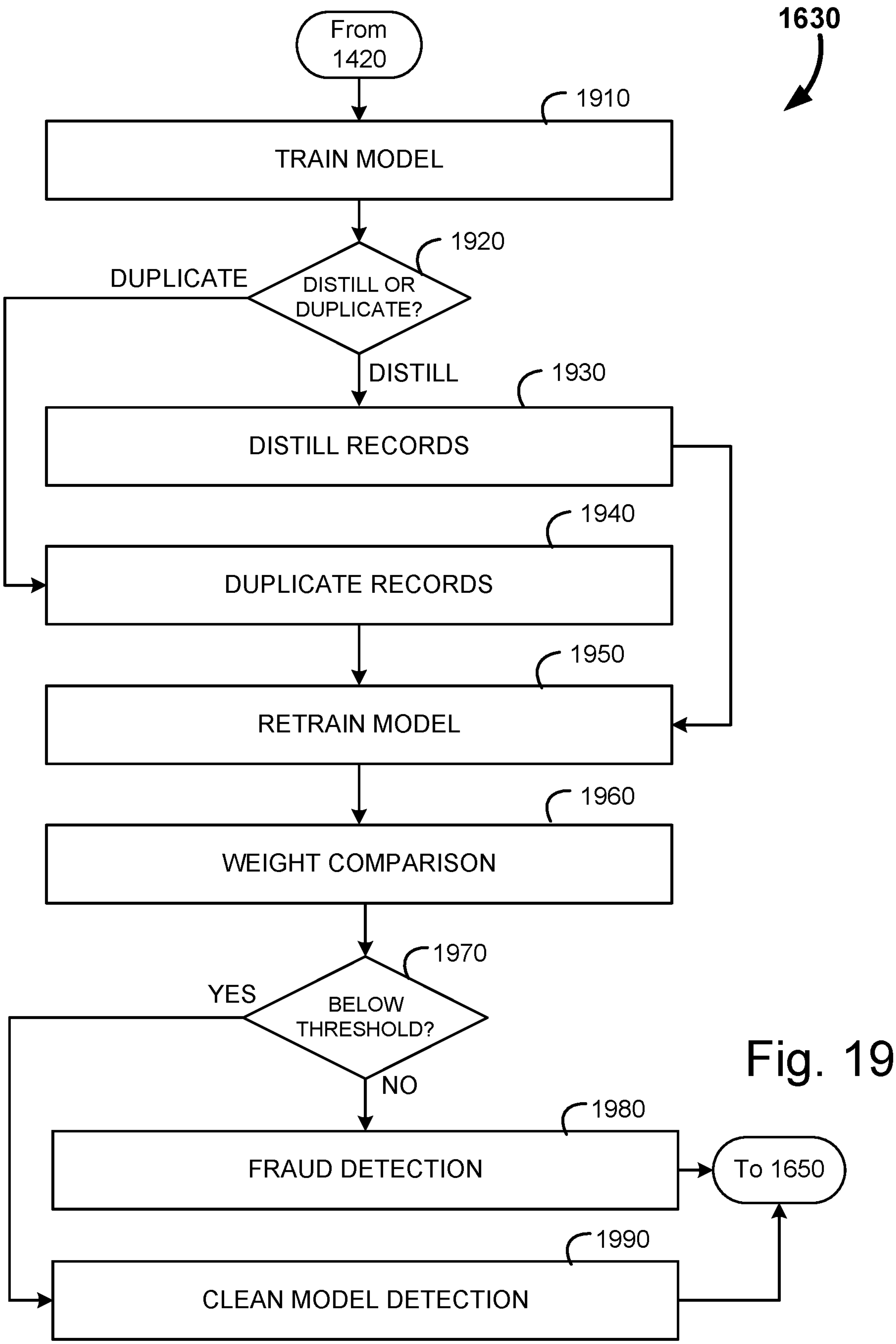
FIG. 19 is a flow diagram for the example process of exfiltration analysis using data duplication and/or distillation techniques, in accordance with some embodiments.

FIG. 19 provides a more detailed description for the process of data duplication and/or distillation analysis. As with many such analysis, the initial step of this exfiltration detection involves the training of the model using the protected dataset (at 1910). This methodology, while closely related in concept, may operate in two ways-either through record duplication, or via record removal/distillation (at 1920). In a duplication event, most if not all the records being analyzed may be duplicated (at 1940). A dataset with every record duplicated should yield model weights that are identical to the non-duplicated data set. In order to circumvent this kind of analysis, a bad actor could include a de-duplication function within their model. In order to thwart this, the duplication event may include the addition of a minor salting of the records (especially focused upon 'non-substantive' records such as identifiers and the like).

In a distillation process, the records from the original dataset may undergo a distillation process (at 1930), which results in a core set of records that yields a similar performance to the model if it were trained upon the entire dataset, as discussed previously.

Regardless of if a duplication or distillation method is employed, the next step is to retrain the model on this altered dataset (at 1950). The weights between the originally trained model and the retrained model are then compared (at 1960). As noted before, model weights for a fully duplicated dataset should be identical to a non-duplicated dataset. Even with some minor salt added to the dataset, the difference in model weights should be minimal. The same is true for a distilled dataset (although the weight differences may be slightly more divergent). As a result, the comparison of weights distance measure may be compared against a configured threshold (at 1970), and distances between weight spaces above the threshold may indicate a fraud event (at 1980), whereas distance measures below the threshold indicates that the model is 'clean' and there is no exfiltration occurring (at 1650).

Figure 20:
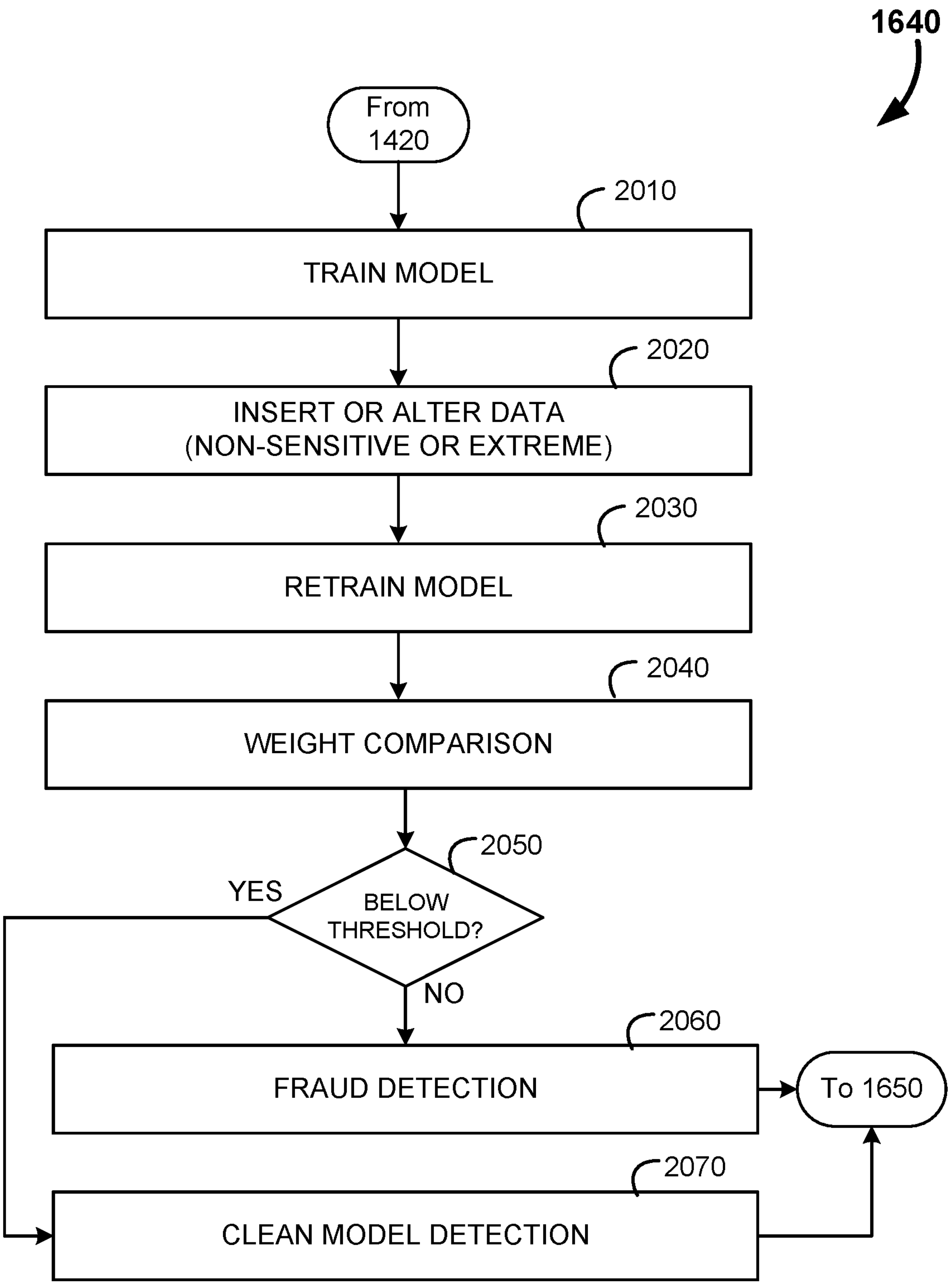
FIG. 20 is a flow diagram for the example process of exfiltration analysis using differential privacy techniques, in accordance with some embodiments.

FIG. 20 provides a more detailed view of the process for data injection analysis for determining if there is an exfiltration attempt. As with a number of the other analyses, the initial step for this exfiltration detection process is to train the model on the underlying protected data set (at 2010). The next step is to alter or insert (or remove in some cases) data from the dataset (at 2020). In some cases, the data that is altered or inserted may have zero impact upon the model's performance but may be data that would be valuable for exfiltration. An example of such data could include patient names, social security numbers, insurance information, and the like.

The model is then retrained using the altered and/or inserted data (at 2030), and the weights between the models may be compared (at 2040). As with other analyses, the degree of difference between the weight space of the original model and the retrained model may be indicative of an exfiltration attempt, as there will be a larger weight difference when data is being stored within the weight matrix as compared against a model where only legitimate weights are updated in response to the data changes. A comparison is thus done between the calculated difference in weights against a configured threshold (at 2050). A fraud/exfiltration event is detected when the distance value is above the threshold (at 2060), or the model is determined to be 'clean' (at 2070) when the distance in the weights is below the threshold.

Regardless of techniques employed for fraud/exfiltration analysis, the impact of an exfiltration event prevents the trained model from ever leaving the sequestered computing node. In some cases (such as when the exfiltration was clearly unintentional) the algorithm developer may be notified of the issue so that it may be corrected. Dependent upon system settings, suspected exfiltration that may be deliberate may not trigger an alert to the algorithm developer in order to not inform them of the exfiltration detection. Either way, the exfiltration attempt is thwarted with the prevention of the trained weights from being released.

In some cases, when exfiltration is determined to be possible, but it is unsure/unclear if the data is actually being stored in the model in an extractible fashion, it may be desirable to still provide model improvement feedback, without the actual release of trained weights. This process prevents any possibility of data exfiltration. In some embodiments, the data steward may prevent the system from exporting trained weights regardless of whether an exfiltration event is identified or not. In these situations, the presently disclosed model improvement techniques may likewise be leveraged in order to generate useful models.

Figure 21:
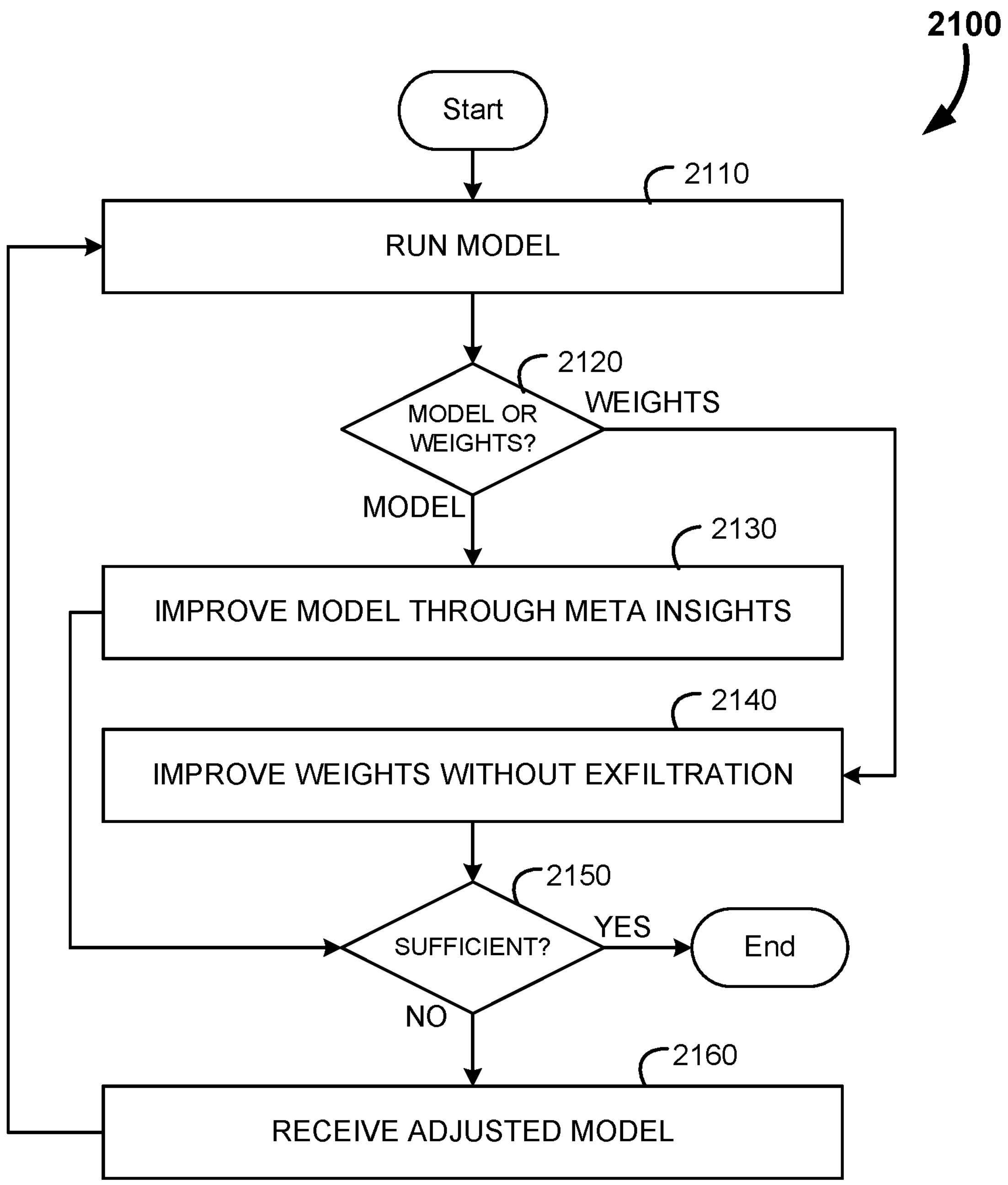
FIG. 21 is a flow diagram for the example process of exfiltration resistant model training, in accordance with some embodiments.
Figure 22:
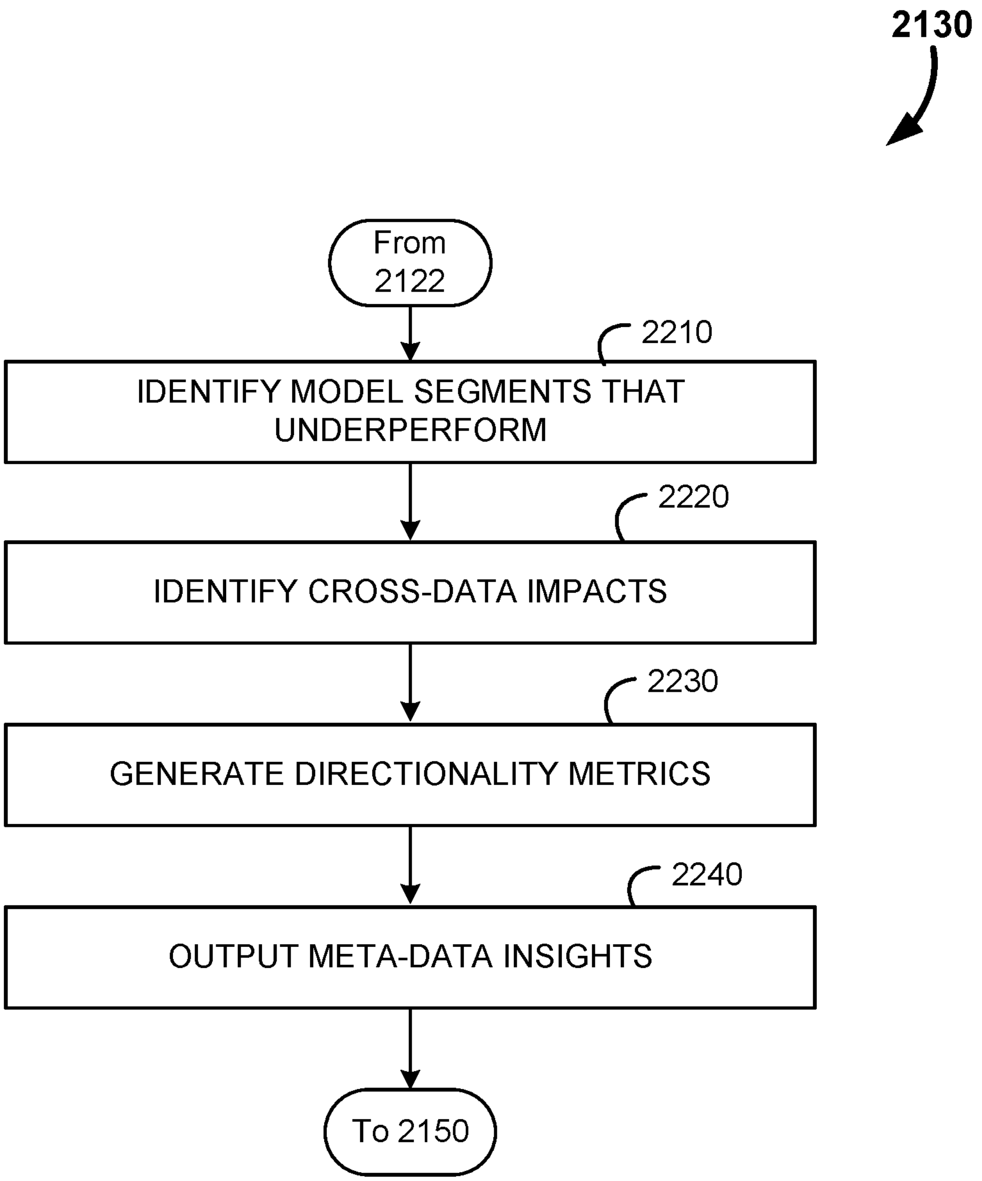
FIG. 22 is a flow diagram for the example process of meta insights model improvement feedback, in accordance with some embodiments.

FIG. 21 provides an example flow diagram of the process for model improvement, which is resistant to data exfiltration, shown generally at 2100. In this example process, within the sequestered computing node, the system runs and trains the raw model upon the protected data (at 2110). The results of the model running provides performance data. The training of the model generates improved weights. The system then determines if the improvement feedback will include model meta data or weight directionality (at 2120). In some embodiments, however, it should be appreciated that both model and weight improvement feedback may be provided to the algorithm developer.

When model meta data is selected the model is improved by utilizing the performance information regarding the model (at 2130). FIG. 21 provides an example of this sub-process. Initially the model segments that underperform the general model are identified (at 2210). Cross data impacts for the model are likewise identified (at 2220). The directionality of the various data that impacts the model's performance (including any cross elasticities between the data) is then determined (at 2230). These meta-data insights are then output to the algorithm developer for updating the model (at 2240). For example, breakdowns of model performance metrics as a function of different metadata classes. A specific example of using meta-data insights would be profiling for patient demographics in a healthcare application. For example, comparing cis-gender male and cis-gender female relative performance, discrepancies could indicate a need for either more data or additional variables or features to balance performance for gender. Another approach to this would be to apply standard measures of importance of variables, including but not limited to Gini, data splitting, entropy reduction, permutation and drop-column methods, in the output.

Returning to FIG. 21, after model updating by the algorithm developer, the models are reprocessed and a determination is made if the model quality/performance is sufficient (at 2150). Sufficiency may in some embodiments, be determined based upon a false positive rate, accuracy measure (such as F1 score), false negative rates, or some combination thereof. If the model is insufficient in its performance, the adjusted model may be received from the algorithm developer (at 2160) and the process may be repeated. Through iteration with such feedback data, the model may be slowly improved. Empirically it has been shown that over sever iterations the model performance can be dramatically improved.

Figure 23:
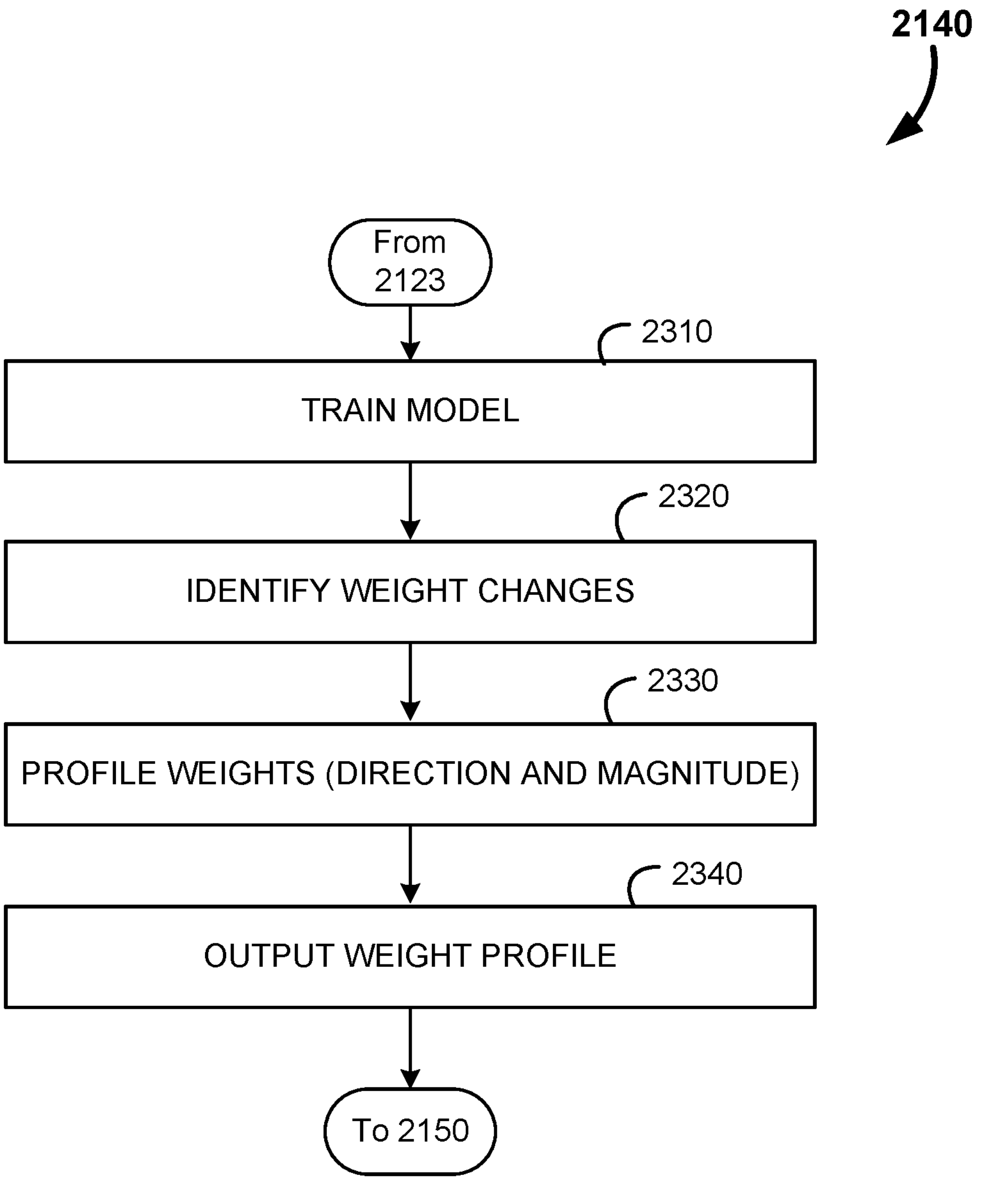
FIG. 23 is a flow diagram for the example process of model weight improvement feedback, in accordance with some embodiments.

In contrast, when improving weights is selected, the process undergoes a weight improvement process (at 2140) whereby the weights themselves are not outputted, thereby eliminating (or at least significantly reducing) the risk of any data exfiltration. FIG. 23 provides a more detailed example of the sub-process of weight improvement. As noted before, the model is trained (at 2310) the trained model weights are compared against to original weights, and the changes in the weights are identified (at 2230). The changes are then profiled in terms of direction of the weight vector and relative magnitude (at 2330). The weights that have the largest impact upon the model performance are likewise profiled. These top identified weights are then provided to the algorithm developer as profiles (at 2340) as opposed to the weights themselves. The profile shows the developer the general direction and relative magnitude that the most important weights need to be changed, and these adjustments are may be iteratively incorporated into the model until the model reaches a sufficient performance level, as previously discussed.

Figure 24A:
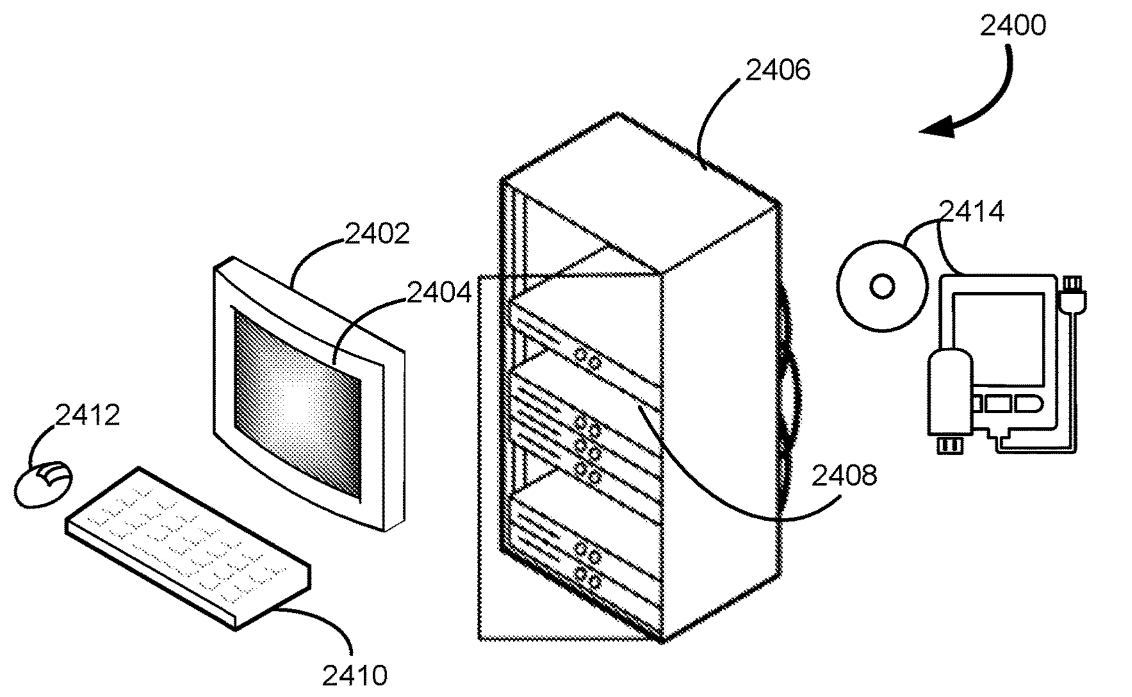
FIGS. 24A and 24B are illustrations of computer systems capable of implementing the zero-trust computing, in accordance with some embodiments.
Figure 24B:
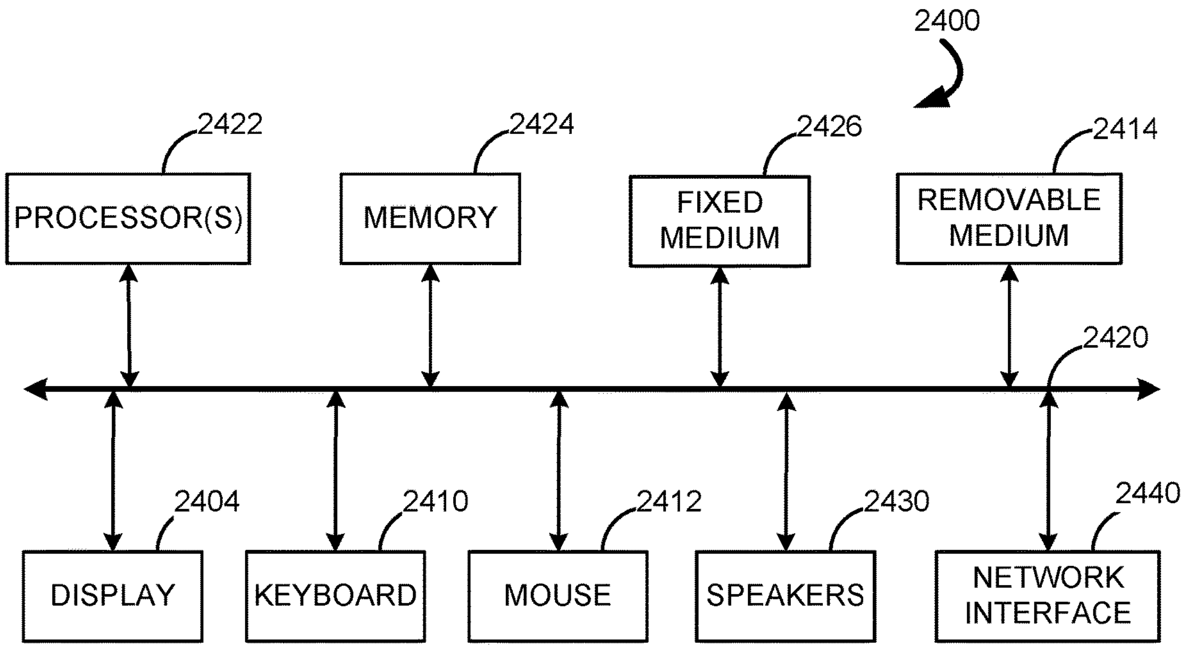

Now that the systems and methods for zero-trust computing have been provided, attention shall now be focused upon apparatuses capable of executing the above functions in real-time. To facilitate this discussion, FIGS. 24A and 24B illustrate a Computer System 2400, which is suitable for implementing embodiments of the present invention. FIG. 24A shows one possible physical form of the Computer System 2400. Of course, the Computer System 2400 may have many physical forms ranging from a printed circuit board, an integrated circuit, and a small handheld device up to a huge supercomputer. Computer system 2400 may include a Monitor 2402, a Display 2404, a Housing 2406, server blades including one or more storage Drives 2408, a Keyboard 2410, and a Mouse 2412. Medium 2414 is a computer-readable medium used to transfer data to and from Computer System 2400.

FIG. 24B is an example of a block diagram for Computer System 2400. Attached to System Bus 2420 are a wide variety of subsystems. Processor(s) 2422 (also referred to as central processing units, or CPUs) are coupled to storage devices, including Memory 2424. Memory 2424 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable form of the computer-readable media described below. A Fixed Medium 2426 may also be coupled bi-directionally to the Processor 2422; it provides additional data storage capacity and may also include any of the computer-readable media described below. Fixed Medium 2426 may be used to store programs, data, and the like and is typically a secondary storage medium (such as a hard disk) that is slower than primary storage. It will be appreciated that the information retained within Fixed Medium 2426 may, in appropriate cases, be incorporated in standard fashion as virtual memory in Memory 2424. Removable Medium 2414 may take the form of any of the computer-readable media described below.

Processor 2422 is also coupled to a variety of input/output devices, such as Display 2404, Keyboard 2410, Mouse 2412 and Speakers 2430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2422 optionally may be coupled to another computer or telecommunications network using Network Interface 2440. With such a Network Interface 2440, it is contemplated that the Processor 2422 might receive information from the network, or might output information to the network in the course of performing the above-described zero-trust analysis of data exfiltration. Furthermore, method embodiments of the present invention may execute solely upon Processor 2422 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2400 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method of data exfiltration analysis comprising:
- receiving an algorithm and a data set within a secure computing node;
- training the algorithm on the data set to generate a set of weights;
- determining if the algorithm originated from a trusted source;
- performing unintentional data exfiltration analysis when the algorithm originates from the trusted source;
- performing intentional data exfiltration analysis when the algorithm does not originate from the trusted source, wherein the intentional data exfiltration analysis includes:
  - measuring computational resources and memory loads available to determine a computational allowance;
  - when the computational allowance is below a threshold performing one of differential privacy methodology, a data duplication or distillation analysis, a data injection analysis and a weight profiling analysis;
  - when the computational allowance is at or above the threshold performing a post fact analysis;
- preventing exporting of the set of weights when an exfiltration event is determined; and
- exporting the set of weights when no exfiltration event is determined.

2. The method of claim 1, wherein the determining if the algorithm is originating from the trusted source includes assessing a reputation for an algorithm developer.

3. The method of claim 1, wherein the unintentional data exfiltration analysis includes weight profiling and data scrubbing.

4. The method of claim 3, wherein the data scrubbing includes comparing the set of weights against the data set.

5. The method of claim 1, wherein the differential privacy methodology comprises:
- training the algorithm with differential privacy data;
- tuning the trained algorithm using the data set;
- comparing the weight space between the trained algorithm and the tuned algorithm; and
- detecting an exfiltration event when the compared weight space is above a configured threshold.

6. The method of claim 1, wherein the post fact analysis comprises:
- training the algorithm using the data set to generate a first trained algorithm;
- removing a record from the data set to generate an altered data set;
- training the algorithm on the altered data set to generate a subsequent trained algorithm;
- comparing the weights of the first trained algorithm against those of the subsequent trained algorithm;
- repeating the prior two steps for each record in the data set; and
- detecting an exfiltration event when any compared weight of any subsequent trained algorithm versus the first trained algorithm is above a configured threshold.

7. The method of claim 1, wherein data duplication or distillation analysis comprises:
- performing at least one of duplicating at least some of the records in the data set and distilling the records of the data set to generate an altered data set;
- training the algorithm on the data set to generate a first set of weights;
- training the algorithm on the altered data set to generate a second set of weights;
- comparing the first set of weights against the second set of weights;
- detecting an exfiltration event when the comparison is above a configured threshold.

8. The method of claim 1, wherein the data injection analysis comprises:
- adding at least one innocuous record into the data set to generate an altered data set;
- training the algorithm on the data set to generate a first set of weights;

training the algorithm on the altered data set to generate a second set of weights;

comparing the first set of weights against the second set of weights;

detecting an exfiltration event when the comparison is above a configured threshold.

9. The method of claim 1, further comprising providing an alert to an algorithm developer when the exfiltration event is determined.

10. A computer program product stored on non-volatile computer storage medium which, when executed by a computer system causes the steps to be performed of:

receiving an algorithm and a data set within a secure computing node;

training the algorithm on the data set to generate a set of weights;

determining if the algorithm originated from a trusted source;

performing unintentional data exfiltration analysis when the algorithm originates from the trusted source;

performing intentional data exfiltration analysis when the algorithm does not originate from the trusted source, wherein the intentional data exfiltration analysis includes:

measuring computational resources and memory loads available to determine a computational allowance;

when the computational allowance is below a threshold performing one of differential privacy methodology, a data duplication or distillation analysis, a data injection analysis and a weight profiling analysis;

when the computational allowance is at or above the threshold performing a post fact analysis;

preventing exporting of the set of weights when an exfiltration event is determined; and exporting the set of weights when no exfiltration event is determined.

11. The computer program product of claim 10, wherein the determining if the algorithm is originating from the trusted source includes assessing a reputation for an algorithm developer.

12. The computer program product of claim 10, wherein the unintentional data exfiltration analysis includes weight profiling and data scrubbing.

13. The method of claim 3, wherein the data scrubbing includes comparing the set of weights against the data set.

14. The computer program product of claim 10, wherein the differential privacy methodology comprises:

training the algorithm with differential privacy data;

tuning the trained algorithm using the data set;

comparing the weight space between the trained algorithm and the tuned algorithm; and detecting an exfiltration event when the compared weight space is above a configured threshold.

15. The computer program product of claim 10, wherein the post fact analysis comprises:

training the algorithm using the data set to generate a first trained algorithm;

removing a record from the data set to generate an altered data set;

training the algorithm on the altered data set to generate a subsequent trained algorithm;

comparing the weights of the first trained algorithm against those of the subsequent trained algorithm;

repeating the prior two steps for each record in the data set; and detecting an exfiltration event when any compared weight of any subsequent trained algorithm versus the first trained algorithm is above a configured threshold.

16. The computer program product of claim 10, wherein data duplication or distillation analysis comprises:

performing at least one of duplicating at least some of the records in the data set and distilling the records of the data set to generate an altered data set;

training the algorithm on the data set to generate a first set of weights;

training the algorithm on the altered data set to generate a second set of weights;

comparing the first set of weights against the second set of weights;

detecting an exfiltration event when the comparison is above a configured threshold.

17. The computer program product of claim 10, wherein the data injection analysis comprises:

adding at least one innocuous record into the data set to generate an altered data set;

training the algorithm on the data set to generate a first set of weights;

training the algorithm on the altered data set to generate a second set of weights;

comparing the first set of weights against the second set of weights;

detecting an exfiltration event when the comparison is above a configured threshold.

18. The computer program product of claim 10, wherein when the computer program product is executed it further performs the steps of providing an alert to an algorithm developer when the exfiltration event is determined.

* * * * *